(12) United States Patent
Kumar Agrawal et al.

(10) Patent No.: US 12,422,896 B1
(45) Date of Patent: Sep. 23, 2025

(54) METHODS AND ELECTRONIC DEVICE ENABLING MOVEMENT OF CONTENT ON A FLEXIBLE DISPLAY IN RESPONSE TO USER MOVEMENT

(71) Applicant: Motorola Mobility LLC, Chicago, IL (US)

(72) Inventors: Amit Kumar Agrawal, Bangalore (IN); Srinivasan Arthanari, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/734,991

(22) Filed: Jun. 5, 2024

(51) Int. Cl.
| | | |
|---|---|---|
| *G09G 5/00* | (2006.01) | |
| *G06F 1/16* | (2006.01) | |
| *G06F 3/01* | (2006.01) | |
| *G06F 3/14* | (2006.01) | |
| *H04N 13/383* | (2018.01) | |
| *H04N 13/398* | (2018.01) | |

(52) U.S. Cl.
CPC ............ *G06F 1/166* (2013.01); *G06F 1/1649* (2013.01); *G06F 1/1652* (2013.01); *G06F 3/013* (2013.01); *G06F 3/017* (2013.01); *G06F 3/1423* (2013.01); *H04N 13/383* (2018.05); *H04N 13/398* (2018.05)

(58) Field of Classification Search
CPC ...... G06F 1/1649; G06F 1/1652; G06F 1/166; G06F 1/1675; G06F 1/1677; G06F 3/013; G06F 3/017; G09F 9/301; H04N 13/383; G09G 2380/02
See application file for complete search history.

(56) References Cited

U.S. PATENT DOCUMENTS

| | | | |
|---|---|---|---|
| 11,302,113 B1* | 4/2022 | Luiz Leal Chagas do Nascimento | ....... G06V 40/1365 |
| 11,509,760 B1* | 11/2022 | Kumar Agrawal | ... G06F 1/1647 |

(Continued)

OTHER PUBLICATIONS

"Galaxy Z Flip5", Samsung India; Exact publication date unknown but believed to be prior to filing of present application; Available online at https://www.samsung.com/in/smartphones/galaxy-z-flip5/.

(Continued)

*Primary Examiner* — Joe H Cheng
(74) *Attorney, Agent, or Firm* — Philip H. Burrus, IV

(57) ABSTRACT

An electronic device and method are disclosed for managing content on a foldable device with a flexible display. The method includes detecting, with sensors, a partially deformed geometric form factor defined by a first device housing pivoted about a hinge relative to a second device housing between an open and closed position. The method further includes presenting, with processors, first content on a display portion of the first device housing and second content on another display portion of the second device housing. Additionally, the method involves detecting, with other sensors, movement of a person viewing the content within the environment of the electronic device. When the movement meets a predefined criterion, the method includes moving the first content to the second display portion and the second content to the first display portion. This approach enhances the user experience by dynamically adjusting content presentation based on user movement.

20 Claims, 11 Drawing Sheets

(56) References Cited

U.S. PATENT DOCUMENTS

| | | | |
|---|---|---|---|
| 11,635,931 B2* | 4/2023 | Kumar Agrawal | G06F 1/1632 345/1.1 |
| 11,907,606 B1* | 2/2024 | Kumar Agrawal | G06F 1/1652 |
| 12,055,977 B1* | 8/2024 | Sisodia | G06F 3/1454 |
| 12,242,317 B2* | 3/2025 | Sisodia | G06F 1/1683 |
| 2017/0272559 A1* | 9/2017 | Cavallaro | G06F 1/1681 |
| 2018/0018753 A1* | 1/2018 | McLaughlin | G06F 1/1626 |
| 2021/0248347 A1* | 8/2021 | Seo | G06V 40/1329 |
| 2025/0110680 A1 | 4/2025 | Agrawal et al. | |

OTHER PUBLICATIONS

"Universal Control: Use a single keyboard and mouse between Mac and iPad", Apple Support; Unknown exact publication date but believed to be prior to filing of present application; Available online at: https://support.apple.com/en-in/102459.

Agrawal, Amit Kumar, "Device Input Control Based on Spatial Alignment of Displays", Application as Filed on Sep. 28, 2023; U.S. Appl. No. 18/374,344.

* cited by examiner

METHODS AND ELECTRONIC DEVICE ENABLING MOVEMENT OF CONTENT ON A FLEXIBLE DISPLAY IN RESPONSE TO USER MOVEMENT

BACKGROUND

Technical Field

This disclosure relates generally to electronic devices, and more particularly to electronic devices having user interfaces operable to present content.

Background Art

The feature sets included with modern portable electronic devices, such as smartphones, tablet computers, smart watches, and other devices, are increasingly becoming richer and more sophisticated. Illustrating by example, while mobile phones were once equipped with simplistic backlit displays having only large grey scale pixels, modern smartphones frequently include high definition organic light emitting diode displays with incredibly small pixels and extremely high contrast ratios capable of presenting high dynamic range images and videos. Many consumers today eschew television sets, instead consuming entire television shows, and even feature length movies, using only a smartphone.

In deformable electronic devices, certain portions of the display can be easier to see than others depending upon the geometry of the deformable electronic device. It would be advantageous to have an improved deformable electronic device that helps to ensure a user continually has an optimized view of important content.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
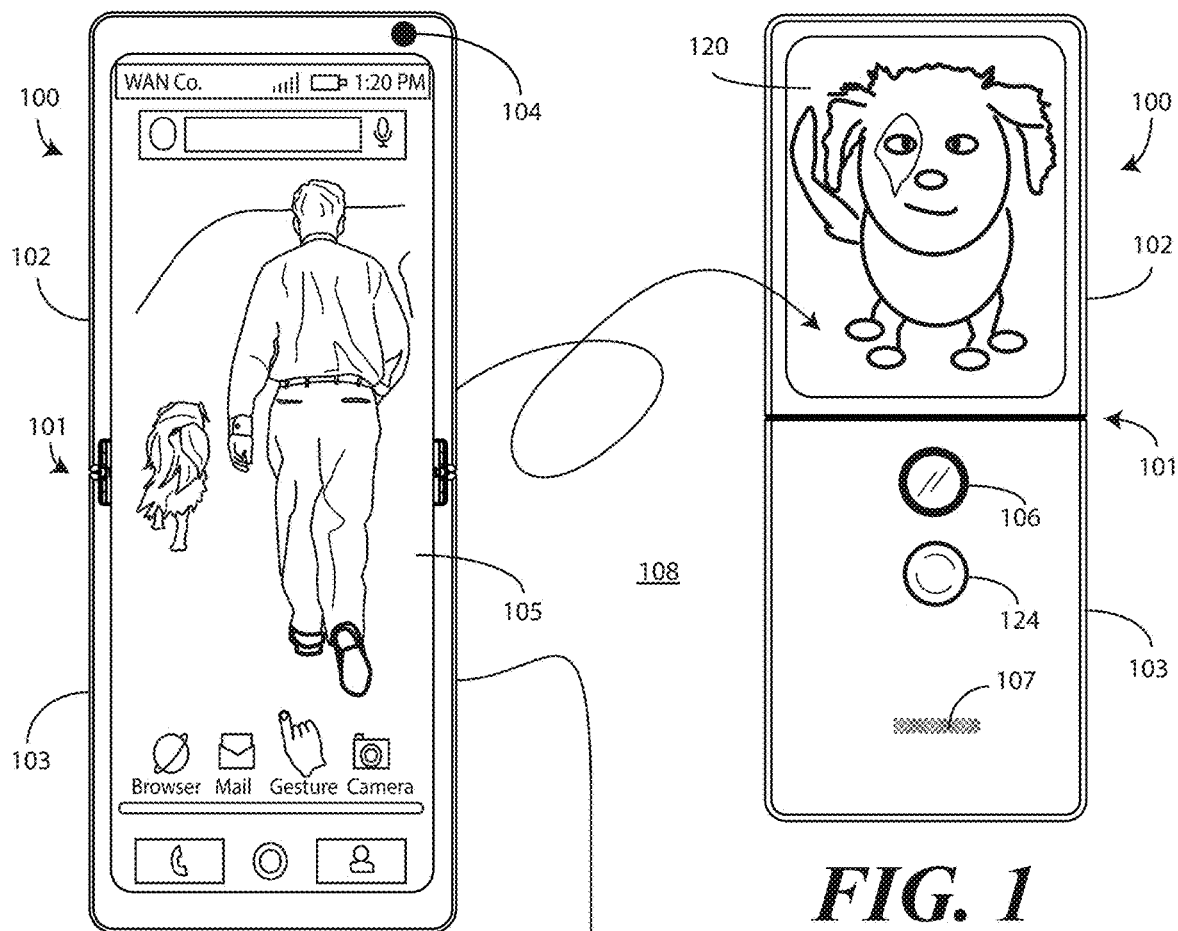
FIG. 1 illustrates one explanatory electronic device configured in accordance with one or more embodiments of the disclosure.
Figure 1:
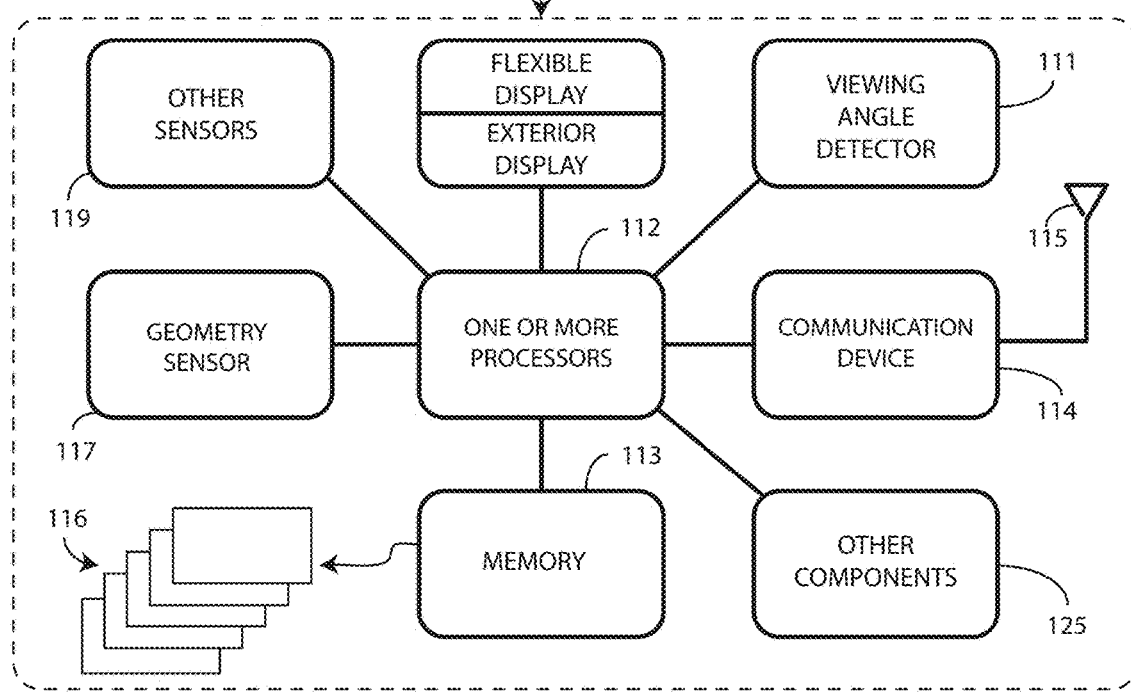

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting, with one or more sensors, a partially deformed geometric form factor defined by a first device housing of the electronic device being pivoted about a hinge relative to a second device housing of the electronic device partially between an axially displaced open position and a closed position, presenting, with one or more processors first content on a display portion spanning a major surface of the first device housing and second content on another display portion spanning a major surface of the second device housing, detecting movement of a person viewing one or both of the first content and/or the second content within an environment of the electronic device, and when the movement of the person meets a predefined criterion, moving the first content from the display portion to the another display portion and second content from the another display portion to the display portion. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of switching content initially presented on a first display portion of the flexible display to be presented on a second display portion when a person viewing the first display portion moves within an environment of the electronic device by at least a predefined amount. The non-processor circuits may include, but are not limited to, a radio receiver, a radio transmitter, signal drivers, clock circuits, power source circuits, and user input devices.

As such, these functions may be interpreted as steps of a method to perform detecting, with at least a first sensor, a first device housing of the electronic device positioned in a partially open position relative to a second device housing coupled to the first device housing by a hinge, detecting, with at least a second sensor, whether a person situated within an environment of the electronic device is viewing a first display portion coupled to the first device housing or a second display portion coupled to the second device housing while the electronic device is in a dual content presentation mode of operation, detecting, with at least a third sensor, the person moving in three-dimensional space relative to the electronic device, and automatically swapping, with one or more processors, content being presented on the first display portion for other content being presented on the second display portion, and vice versa, in response to the person moving in the three-dimensional space relative to the electronic device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that is geometrically deformable. In one or more embodiments, the electronic device includes a first device housing that is pivotable about a hinge relative to a second device housing between a closed position and an axially displaced open position. In one or more embodiments, the hinge is configured as a "friction hinge" that allows a user to pivot the first device housing relative to the second device housing to any position between the closed position and the axially displaced open position with that device geometry being retained by a frictional element situated in the hinge. In other embodiments, the electronic device will include a deformable housing allowing a user to move a first device housing portion relative to a second device housing portion to various positions between the closed position and the axially displaced open position.

In some embodiments, this ability to deform the electronic device and manipulate it between the closed position and the axially displaced open position allows for the inclusion of a second display, which is sometimes known as a "quick view display" or "qvd" due to the fact that it is always exposed regardless of whether the electronic device is in the axially displaced open position or the closed position. By contrast, in some embodiments the primary display is concealed when the electronic device is in the closed position and revealed as the electronic device transitions from the closed position to the axially displaced open position.

Inclusion of the second display allows users of the electronic device to get information at a quick glance when the electronic device is in the closed position without having to transition the electronic device from the closed position to the axially displaced open position. Another advantage offered by this provision of the second display is that in one or more embodiments it provides a substantial amount of area upon which to present content such as images or videos.

When an electronic device is equipped with the friction hinge, embodiments of the disclosure contemplate that a user may partially deform the electronic device between the axially displaced open position and the closed position and place the electronic device on a flat surface to consume content. Illustrating by example, a user may partially bend a first device housing relative to a second device housing between the axially displaced open position and the closed position and place the electronic device on a flat surface to engage in a videoconference or to watch a television show or movie. This partial bending can cause the electronic device to resemble the partial bend exhibited by a laptop computer. Thus, even though the electronic device may be a smartphone, some refer to this partially bent state as being the "laptop geometric form factor" or "laptop mode."

Moreover, since the flexible display (or a first display and second display when two non-flexible displays are used) can be visually separated by the hinge when the electronic device is in the partially deformed state, embodiments of the disclosure contemplate that a user may consume first content on a first portion of the display situated to a first side of the hinge and may consume second content on a second portion of the display situated to a second side of the hinge. For instance, a user may engage in the videoconference using the first portion of the display and may be intermittently checking stock and futures quotes using the second portion of the display.

A problem that can occur with such a mode of operation is that when using this "split screen" mode of content consumption in a deformable electronic device when in a specific geometric form factor, one example of which is the laptop geometric form factor, the content consumption experience may not be well-defined. This is especially true when the upper display portion is vertical and easily visible. In many instances, this geometric form factor can make the lower display portion horizontal and difficult to see or operate. This imbalance of visibility within the gaze cone of a user can create inconvenience and can further make it difficult to view and operate the vertical display portion.

To illustrate by example, imagine a user named Olivier who owns a deformable electronic device. Now imagine that Olivier enjoys watching long-form video podcasts on his deformable electronic device, especially when it is in the laptop geometric form factor. Oliver likes this geometric form factor because the friction hinge allows the friction hinge to function as a built-in tripod.

In this geometric form factor, Olivier can pin the video to the top vertical portion of the flexible display that spans the hinge of the deformable electronic device, thereby allowing for a convenient viewing experience of that display portion. However, whenever Olivier needs to check something else using the horizontal portion of the flexible display, he has to pick up the device, breaking the interaction with the video and causing inconvenience. Additionally, when Olivier moves away and returns, the pinned video cannot be seen from the top-down viewing direction. Indeed, to view the horizontal display portion clearly, either the deformable electronic device needs to be flattened and lifted up to position it within the user's gaze cone or the user has to bend forward and look down to adjust the viewing direction, so the gaze cone is oriented toward the bottom portion of the flexible display.

Thus, Olivier wishes for a better way to leverage both the top and bottom portions of his deformable device when it is placed in laptop geometric form factor. While the bottom portion of the flexible display may display messages, for example, when Oliver is watching the video the bottom portion of the flexible display is not easily readable at this angle. Accordingly, Olivier wants a solution that allows him to seamlessly switch between the top and bottom portions of the screen while maintaining a clear view of the content.

Advantageously, embodiments of the disclosure provide a better way to leverage both the top and bottom portions of the deformable electronic device when being operated in a laptop geometric form factor. Embodiments of the disclosure address the problem of managing a "split screen" on a deformable electronic device when operating in a laptop geometric form factor. Embodiments of the disclosure provide several steps to ensure an optimal viewing experience for the user.

In one or more embodiments, the deformable electronic device is equipped with sensors to determine whether it is partially deformed between an axially displaced open position and a closed position. Said differently, in one or more embodiments the one or more sensors determine whether the deformable electronic device is operating in a laptop geometric form factor. In one or more embodiments, when the deformable electronic device is operating in the laptop geometric form factor, the one or more sensors can also determine whether the deformable electronic device is positioned with one portion of the device housing situated flat on a surface, such as a table, with another portion pivoted upright, such as oriented vertically or almost vertically.

In one or more embodiments, the one or more sensors of the deformable electronic device next determine if the user is actively viewing content on the vertical portion of the flexible display. In one or more embodiments, this can be done using the one or more sensors to monitor the user's gaze. One or more processors can also determine the applications running on the device as well, as video content presentation applications on a particular portion of the flexible display are more likely to be actively viewed than are, say, user actuation targets that are static and allow other applications to be launched. In one or more embodiments, if the "split screen" mode feature where first content is being presented on a first portion of the flexible display situated to one side of a fold and second content is being presented on a second portion of the flexible display situated to another side of the fold is enabled, one or more processors of the deformable electronic device "mark" the vertical portion as the "portion of interest" while operating in the laptop geometric form factor.

In one or more embodiments, the one or more sensors also monitor the user's movement. Illustrating by example, an image capture device can capture one or more images to track the user's face, torso, and shift of gaze. In one or more embodiments, when the one or more processors detect that the user's gaze is now aligned with the horizontal portion of the flexible display, the one or more processors can switch the "portion of interest" to the horizontal portion of the flexible display. In one or more embodiments, the one or more processors can also swap the content between the two portions. For example, a video playing on the vertical portion would now be played on the horizontal portion, and so forth.

In summary, embodiments of the disclosure provide an "instant swap" feature when one or more sensors of the deformable electronic device detect the user's bodily movement and shift of eye gaze from the upper device housing to the lower device housing. Thereafter, one or more processors of the deformable electronic device can cause first content being presented on a first portion of the flexible display to move to a second portion of the flexible display and vice versa. This "swapping" action allows the user to seamlessly switch between the top and bottom portions of the flexible display while maintaining a clear view of the content associated with the portion of interest. Additionally, embodiments of the disclosure can be further enhanced by allowing the user to manually swap the contents between the upper and lower device housing through a gesture while their gaze remains focused on a particular screen portion of interest. Overall, embodiments of the disclosure aim to optimize the viewing experience on a deformable electronic device in laptop or flex mode by intelligently managing the split screen and ensuring that the content of interest is always available, and easily visible to the user.

In one or more embodiments, a method in an electronic device comprises detecting, with one or more sensors, a partially deformed geometric form factor defined by a first device housing of the electronic device being pivoted about a hinge relative to a second device housing of the electronic device partially between an axially displaced open position and a closed position. In one or more embodiments, the method comprises presenting, with one or more processors, first content on a display portion spanning a major surface of the first device housing and second content on another display portion spanning a major surface of the second device housing, wherein the first content and the second content are different.

In one or more embodiments, the method comprises also detecting, with one or more other sensors, movement of a person viewing one or both of the first content and/or the second content within an environment of the electronic device. In one or more embodiments, when the movement of the person meets a predefined criterion, the method comprises moving, with the one or more processors, the first content from the display portion to the another display portion and the second content from the another display portion to the display portion.

Current solutions for managing content on foldable devices in various modes do not adequately address the issue of content visibility and interaction based on the user's position and gaze. For instance, when a user is viewing content on the vertical portion of the display and wishes to interact with content on the horizontal portion, they may need to physically reposition the device or themselves. This can interrupt the user's workflow and diminish the overall experience. Additionally, when the user moves away and then returns, the content on the vertical portion may not be easily viewable from a top-down perspective, further complicating the interaction.

The present system provides a method for managing split screen content on a foldable electronic device in a laptop or flex mode. The system utilizes device sensors to determine the device's placement in a flex or laptop mode, where a portion of the device housing is flat on a surface and another portion is vertical or nearly vertical. The system detects the user's gaze and body movement to identify which portion of the screen the user is actively viewing. Upon detecting a shift in the user's gaze or position, the system dynamically swaps the content between the display portions, ensuring that the content of interest is presented on the portion of the display that the user is actively viewing. This solution enhances the user experience by providing seamless interaction with the device, regardless of the user's position or the device's orientation.

In one or more embodiments, an electronic device comprises a first device housing coupled to a second device housing by a hinge such that the first device housing is pivotable about the hinge relative to the second device housing between a closed position and an axially displaced open position. In one or more embodiments, the electronic device comprises one or more sensors operable to determine a partially deformed geometric form factor of the electronic device between the axially displaced open position and the closed position.

In one or more embodiments, the electronic device comprises a first display portion coupled to the first device housing and a second display portion coupled to the second device housing. For example, when a flexible display is coupled to the first device housing and the second device housing, a first portion of the flexible display situated to one side of the hinge will be coupled to the first device housing while a second portion of the first device housing situated to another side of the hinge will be coupled to the second device housing.

In one or more embodiments, the electronic device comprises one or more processors operable with the one or more sensors, the first display portion, and the second display portion. In one or more embodiments, the one or more processors switch content initially presented on the first display portion to be presented on the second display portion when a person viewing the first display portion moves within an environment of the electronic device by at least a predefined amount.

In one embodiment of the electronic device as outlined below, the first and second device housings are constructed from a durable polymer material, allowing for a lightweight yet robust design that can withstand the rigors of daily use. The hinge mechanism connecting the two housings can be engineered with precision to ensure smooth and consistent operation, thereby enabling the device to maintain its partially deformed geometric form factor with ease. The first display portion, which is coupled to the first device housing, and the second display portion, which is coupled to the second device housing, can be made from a high-resolution, flexible OLED material that provides vivid colors and deep blacks for an immersive viewing experience.

In another embodiment, the electronic device features a biometric sensor array that includes facial recognition technology to accurately detect the user's presence and orientation relative to the device. This allows the one or more processors within the device to intelligently switch content between the first and second display portions based on the user's position and movements, thereby enhancing the user experience by ensuring that the most relevant content is always front and center.

In some embodiments, the electronic device incorporates advanced gesture recognition capabilities, where the electronic device is equipped with a three-dimensional depth-sensing camera system. This system enables the device to interpret specific user gestures in three-dimensional space, allowing for intuitive content swapping between the display portions without the need for physical contact with the device. This feature is particularly useful in scenarios where the user's hands are occupied or when the device is being used in a hands-free environment where touchless operation is preferred.

In yet another embodiment, the electronic device is designed with an adaptive audio system that dynamically adjusts the audio output based on which display portion is currently active. This ensures that sound is always directed towards the user, providing a consistent and high-quality audio experience regardless of the device's orientation or the user's position.

An embodiment of the electronic device can even include a software suite that is optimized for productivity and multitasking. The software allows for seamless content management across the two display portions, with the ability to run multiple applications simultaneously and switch them between displays as needed. This functionality is complemented by a powerful processor and ample memory, making the device suitable for both professional and personal use cases where efficiency and flexibility are key.

In one or more embodiments, a method in an electronic device comprises detecting, with at least a first sensor, a first device housing of the electronic device positioned in a partially open position relative to a second device housing coupled to the first device housing by a hinge. In one or more embodiments, the method comprises detecting, with at least a second sensor, whether a person situated within an environment of the electronic device is viewing a first display portion coupled to the first device housing or a second display portion coupled to the second device housing while the electronic device is in a dual content presentation mode of operation.

In one or more embodiments, the method comprises detecting, with at least a third sensor, the person moving in three-dimensional space relative to the electronic device. In one or more embodiments, the method comprises automatically swapping, with one or more processors, content being presented on the first display portion for other content being presented on the second display portion, and vice versa, in response to the person moving in the three-dimensional space relative to the electronic device.

In effect, embodiments of the electronic device automatically swap the content being presented on the first display portion with the content being presented on the second display portion in response to the person moving in three-dimensional space relative to the device. This allows for a seamless transition between the two display portions, providing a more dynamic and interactive user experience. By detecting the person's movement and automatically swapping the content, the device ensures that the user always has access to the desired information or media on the appropriate display portion. Additionally, embodiments of the disclosure include dimming the other content after the swapping, which helps to focus the user's attention on the active display portion. This technical effect enhances the usability and convenience of the electronic device, allowing for efficient multitasking and improved content consumption. Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, a partially open position, shown and described below with reference to FIG. 3, and an open position, shown and described below with reference to FIG. 4.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge 101. However, in other embodiments two or more hinges can be incorporated into the electronic device 100 to allow it to be folded in multiple locations.

While the illustrative electronic device 100 of FIG. 1 includes a hinge 101, embodiments of the disclosure are not so limited. In other embodiments, electronic devices configured in accordance with embodiments of the disclosure will not include a hinge 101. Illustrating by example, the electronic device 100 may include a flexible device housing, or the first device housing and second device housing can each comprise flexible device housings. A single device housing, for instance, can be manufactured from bendable materials. In still other embodiments, the electronic device 100 can be bendable via a combination of hinge components and non-hinge components.

Accordingly, in another embodiment the electronic device 100 of FIG. 1 includes a single housing. In one or more embodiments, that housing is flexible. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

The illustrative electronic device 100 of FIG. 1 includes multiple displays. A first display 105, also referred to as the interior display or the rear-facing display, is concealed when the first device housing 102 is pivoted about the hinge 101 relative to the second device housing 103 to a closed position. For example, the first display 105 is concealed in FIG. 2 below. This first display 105 is then revealed when the first device housing 102 is pivoted about the hinge 101 relative to the second device housing 103 from the closed position to an axially displaced open position. Thus, the first display 105 is revealed as the electronic device 100 transitions from the closed position of FIG. 2 to the open position of FIG. 4.

In one or more embodiments, the electronic device 100 also includes at least a second display 120. In the illustrative embodiment of FIG. 1, the second display 120 can be referred to as an exterior display, quick view display, or front-facing display, as the second display 120 is exposed both when the first device housing 102 and the second device housing 103 are pivoted about the hinge 101 to the closed position, the axially displaced open position, or any position therebetween. Thus, the second display 120 is exposed both in the axially displaced open position of FIG. 1 and the closed position of FIG. 2. In one or more embodiments, each of the first display 105 and the second display 120 is a high-resolution display.

While shown coupled to the first device housing 102, it should be noted that the second display 120 could be coupled to either of the first device housing 102 or the second device housing 103. In other embodiments, the second display 120 can be coupled to the first device housing 102, while a third display (not shown) is coupled to the second device housing 103. Thus, electronic devices configured in accordance with embodiments of the disclosure can include displays situated at different positions.

As with the second display 120, the first display 105 can also be coupled to either or both of the first device housing 102 or the second device housing 103. In this illustrative embodiment, the first display 105 is coupled to both the first device housing 102 and the second device housing 103 and spans the hinge 101. In other embodiments, the "first" display can be two displays, with one coupled to the first device housing 102 and another coupled to the second device housing 103. In either case, this first display 105 is considered to be an "interior" display because it is concealed when the first device housing 102 and the second device housing 103 are in the closed position.

In one or more embodiments, either or both of first display 105 and second display 120 can be touch-sensitive. Where this is the case, users can deliver user input to one or both of the first display 105 or the second display 120 by delivering touch input from a finger, stylus, or other objects disposed proximately with the first display 105 or the second display 120.

In the illustrative embodiment of FIG. 1, since the first display 105 spans the hinge 101, it is configured to be flexible. For instance, in one embodiment the first display 105 is configured as an organic light emitting diode (OLED) display fabricated on a flexible plastic substrate. This allows the first display 105 to be flexible so as to deform when the first device housing 102 pivots about the hinge 101 relative to the second device housing 103. However, it should be noted that other types of displays would be obvious to those of ordinary skill in the art having the benefit of this disclosure. In other embodiments conventional, rigid displays can be disposed to either side of the hinge rather than using a flexible display.

In one or more embodiments, the first display 105 is configured as an OLED constructed on flexible plastic substrates to allow the first display 105 to bend in accordance with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the first display 105 may be formed from multiple layers of flexible material such as flexible sheets of polymer or other materials.

In this illustrative embodiment, the first display 105 is coupled to the first device housing 102 and the second device housing 103. Accordingly, the first display 105 spans the hinge 101 in this embodiment. In one or more embodiments, the first display 105 can instead be coupled to one, or two, spring-loaded, slidable trays that situate within one or both of the first device housing 102 and the second device housing 103. The use of one or two slidable trays advantageously allows the first display 105 to be placed in tension when the electronic device 100 is in the open position. This causes the first display 105 to be flat, rather than wavy due to mechanical memory effects, when the electronic device 100 is in the open position.

Features can be incorporated into the first device housing 102 and/or the second device housing 103. Examples of such features include imager 106, which in this embodiment is an exterior or front facing imager. The imager 106, which can be any number of types of image capture devices, has its lens situated such that it is directed away from a user who is holding the electronic device 100 and facing the first display 105. This allows the imager 106 to receive light directed toward the electronic device 100 from a location in front of the user when the user is holding the electronic device 100 and facing the first display 105.

Instead of, or alternatively in addition to, the imager 106, a second, rear facing imager 104 can be positioned on the interior side of the electronic device 100 to receive light and images directed toward the first display 105. When a user is holding the electronic device 100 and looking at the first display, this second, rear facing imager 104 can be used to take a selfie without turning the electronic device 100 around. While two imagers are shown in the illustrative embodiment of FIG. 1, it should be noted that embodiments of the disclosure can include additional imagers mounted in different positions that can be actuated to capture images from different angles.

Other examples of features that can be incorporated into the first device housing 102 and/or the second device housing 103 include an optional speaker port 107. While shown situated on the exterior of the electronic device 100 in FIG. 1, the optional speaker port 107 could also be placed on the interior side as well. In this illustrative embodiment, a user interface component 124, which may be a button or touch sensitive surface, can also be disposed along the exterior side of the second device housing 103. As noted, any of these features shown being disposed on the exterior side of the electronic device 100 could be located elsewhere, such as on the interior side or minor sides in other embodiments.

A block diagram schematic of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In one or more embodiments, the electronic device 100 also includes a viewing angle detector 111 operable to detect a user's position relative to the first device housing 102 and second device housing 103 of the electronic device 100. Illustrating by example, in one or more embodiments the viewing angle detector 111 can detect actuation of the imager 106 and/or second imager 104 and/or image capture operations. The viewing angle detector 111 can also include a facial recognition module that analyzes images captured by the imager 106 and/or second imager 104 to identify facial characteristics present in images captured by the imager 106 and/or second imager 104.

In one or more embodiments, in response to the viewing angle detector 111 identifying these or other image capture operations, the one or more processors 112 can determine where the user is situated within the environment 108 of the electronic device 100, as well as whether the first device housing 102 or the second device housing 103 situates more centrally within a gaze cone of the user situated within the environment 108 of the electronic device 100. In one or more embodiments, the viewing angle detector 111 can also determine where the user is located relative to the electronic device 100.

Thus, in one or more embodiments the viewing angle detector 111 monitors the user's position relative to the electronic device 100 and determines which portion of the flexible display 105 the user is looking at (or falls within their gaze cone). To achieve this, in one or more embodiments the viewing angle detector 111 utilizes a combination of sensors 119 and techniques.

One of the one or more sensors 119 that could be employed is a proximity sensor, which measures the distance between the user's face and the electronic device 100. By analyzing the proximity data, the viewing angle detector 111 can estimate the user's position and determine whether they are viewing the upper or lower portion of the flexible display 105.

Another sensor 119 that can be utilized is an accelerometer, which detects the orientation and movement of the electronic device 100. By analyzing the accelerometer data, the viewing angle detector 111 can infer the device's position relative to the user within the environment 108 and determine the user's viewing angle.

In addition to these sensors 119, the viewing angle detector 111 may also incorporate a gyroscope to measure the device's angular velocity and rotation. This information can further assist in accurately determining the user's position and the portion of the flexible display 105 to which they are looking.

Alternative techniques for monitoring the user's position relative to the electronic device 100 include the use of depth-sensing cameras or infrared sensors. These technologies can capture the user's position in three-dimensional space, allowing for more precise tracking of their movements and gaze direction.

Furthermore, the viewing angle detector 111 can employ advanced facial recognition algorithms to identify the user's face and track their eye movements. By analyzing the position and movement of the user's eyes, the viewing angle detector 111 can determine which portion of the flexible display 105 falls within the user's gaze cone.

Overall, in one or more embodiments the viewing angle detector 111 combines various sensors 119 and techniques to accurately monitor the user's position relative to the electronic device 100 and determine their viewing angle. This information can then be used for dynamically swapping content between display portions and providing an optimized viewing experience for the user.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present content offerings including images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the electronic device 100 includes one or more geometry sensors 117, operable with the one or more processors 112, to detect a particular geometry, geometric form factor, or deformation state of the electronic device 100. Illustrating by example, in one or more embodiments the one or more geometry sensors 117 can detect a bending operation that causes the first device housing 102 to pivot about the hinge 101 relative to the second device housing 103, thereby transforming the electronic device 100 into a deformed geometry, such as that shown in FIGS. 2-3. The inclusion of the one or more geometry sensors 117 is optional, and in some embodiment geometry sensors 117 will not be included.

In one embodiment, the geometry sensors 117 comprise passive resistive devices manufactured from a material with an impedance that changes when the material is bent, deformed, or flexed. By detecting changes in the impedance as a function of resistance, the one or more processors 112 can use the one or more geometry sensors 117 to detect bending of the first device housing 102 about the hinge 101 relative to the second device housing 103. In one or more embodiments, each geometry sensor 117 comprises a bi-directional flex sensor that can detect flexing or bending in two directions. In one embodiment, the one or more geometry sensors 117 have an impedance that increases in an amount that is proportional with the amount it is deformed or bent. Other types of geometry sensors 117 will be obvious to those of ordinary skill in the art having the benefit of this disclosure.

In one embodiment, the one or more processors 112 may generate commands or execute control operations based on information received from the various sensors, including the one or more geometry sensors 117, the viewing angle detector 111, or sensors 119. Illustrating by example, in one or more embodiments the one or more processors 112 switch content initially presented on the first display portion to be presented on a second display portion when a person viewing the first display portion moves within the environment 108 of the electronic device 100 by at least a predefined amount. In one or more embodiments, the first display portion and the second display portion comprise portions of a singular, unitary, flexible display 105 coupled to the first device housing 102 and the second device housing 103 and spanning the hinge 101. In one or more embodiments, the one or more processors 112 switch other content initially presented on the second display portion to be presented on the first display portion when the person viewing the first display portion moves within the environment 108 of the electronic device 100 by at least the predefined amount.

The one or more processors 112 may also generate commands or execute control operations based upon information received from a combination of the one or more geometry sensors 117, the viewing angle detector 111, or the one or more sensors 119. Alternatively, the one or more processors 112 can generate commands or execute control operations based upon information received from the one or more geometry sensors 117 or the viewing angle detector 111 alone. Moreover, the one or more processors 112 may process the received information alone or in combination with other data, such as the information stored in the memory 113.

The one or more sensors 119 may include a microphone, an earpiece speaker, a second loudspeaker (disposed beneath speaker port 107), and a user interface component such as a button or touch-sensitive surface. The one or more sensors 119 may also include key selection sensors, proximity sensors, a touch pad sensor, a touch screen sensor, a capacitive touch sensor, a light sensor, and one or more switches. Touch sensors may used to indicate whether any of the user actuation targets present on the display 105 or display 120 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The one or more sensors 119 can also include audio sensors and video sensors (such as a camera).

The one or more sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 125 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
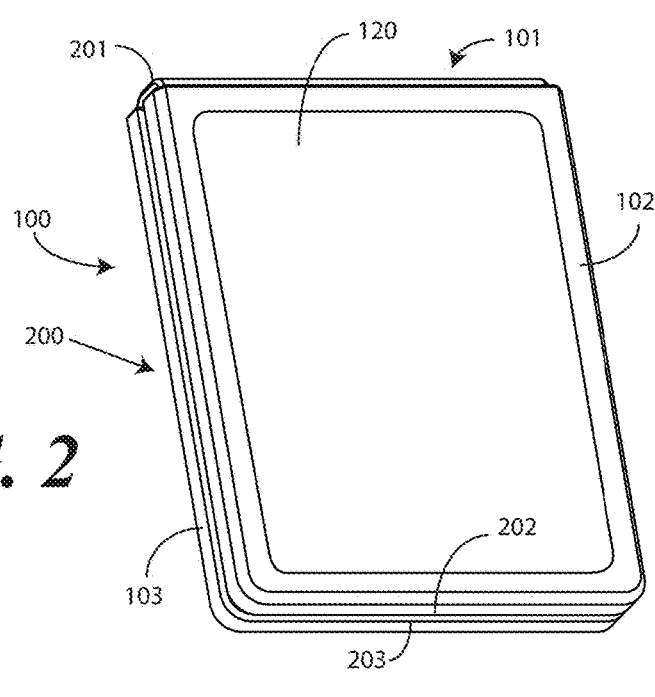
FIG. 2 illustrates a perspective view of one explanatory electronic device in accordance with one or more embodiments of the disclosure in a closed position.

Turning now to FIG. 2, illustrated therein is the electronic device 100 in a closed state. In this state, the first device housing 102 has been pivoted about the hinge 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the clam, thereby giving rise to the "clamshell" style of device. When the clamshell opens, the flexible display (105) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 200 will be obvious to those of ordinary skill in the art having the benefit of this disclosure. As shown, the exterior display 120 is visible and exposed when the electronic device is in the closed position 200.

Figure 3:
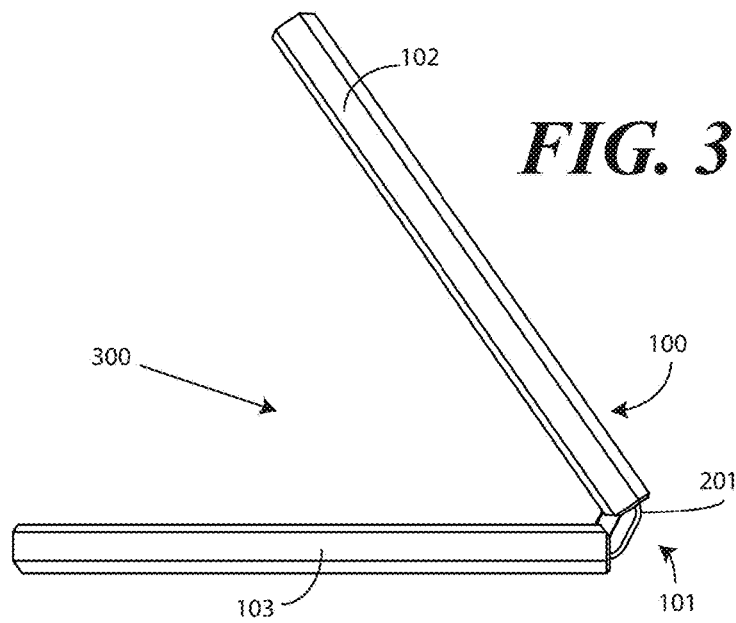
FIG. 3 illustrates a side elevation view of one explanatory electronic device in accordance with one or more embodiments of the disclosure in a partially open position.

Turning now to FIG. 3, the electronic device 100 is shown in a geometric form factor defined by a deformed geometry such that the first device housing 102 and the second device housing 103 are between the closed position (200) of FIG. 2 and an axially displaced open position. Where the hinge 101 includes frictional elements, the electronic device 100 may remain in this geometric form factor until a user pivots one of the first device housing 102 or the second device housing 103 about the hinge 101 to another geometric form factor.

The geometric form factor of FIG. 3 is that of a partially open position 300. Specifically, the first device housing 102 is pivoting about the hinge 101 away from the second device housing 103 toward an open position. The open position 300 shown in FIG. 3 can be referred to as a "tent position." In the side elevation view of FIG. 3, the hinge housing 201 is exposed between the first device housing 102 and the second device housing 103.

Figure 4:
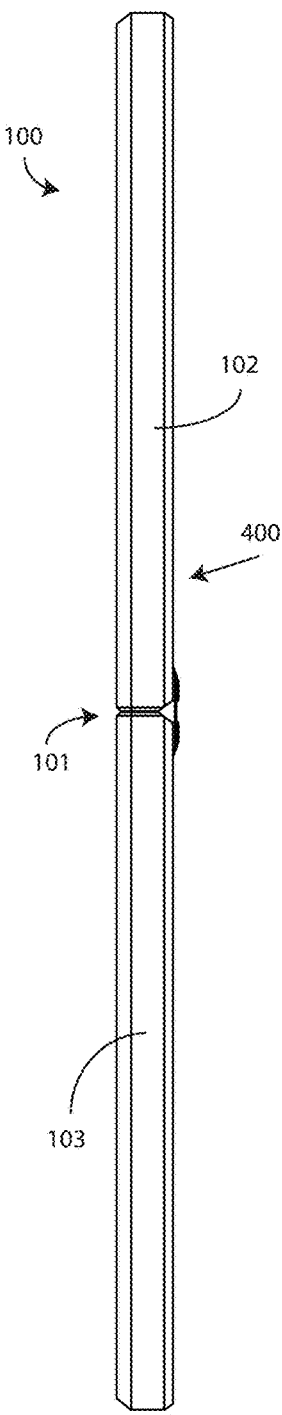
FIG. 4 illustrates a side elevation view of one explanatory electronic device in accordance with one or more embodiments of the disclosure in an axially displaced open position.

Turning now to FIG. 4, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the flexible display (105). In this illustrative embodiment, this causes the hinge housing (201) to be concealed within the first device housing 102 and second device housing 103.

In such a configuration, the first device housing 102 and the second device housing 103 effectively define a plane.

Since this illustrative embodiment includes a flexible display 105, the flexible display 120 has been elongated into a flat position.

In one or more embodiments, the electronic device 100 of FIGS. 2-4 comprises an apparatus for managing "split screen" presentations, and includes a foldable electronic device having a first portion and a second portion, device sensors configured to determine whether the foldable electronic device is in a flex mode or a laptop mode, a display screen divided into the first portion and the second portion, a gaze detection module configured to detect a user's gaze and determine if the user is actively viewing content on the second portion of the display screen, a split mode feature enabled on the foldable electronic device, a content marking module configured to mark the second portion of the display screen as a "portion of interest" when the foldable electronic device is in flex mode, and a user movement detection module configured to monitor the user's face, torso, and shift of gaze.

In one or more embodiments, the electronic device 100 comprises a content swapping module configured to automatically switch the "portion of interest" and swap the content between the first portion and the second portion of the display screen based on the detected user's gaze and bodily movement. In one or more embodiments, the electronic device 100 comprises an instant swap feature provided in response to the detected user's bodily movement and shift of eye gaze. The electronic device 100 can also include a manual swapping gesture module configured to allow manual swapping of contents between the first portion and the second portion of the display screen in flex mode while the user's gaze remains focused on a particular screen "portion of interest."

In one or more embodiments, the electronic device 100 detects of the partially deformed geometric form factor by detecting the angle of the hinge between the first device housing 102 and the second device housing 103 to determine the degree of deformation. In one or more embodiments, the electronic device 100 presents content on the display portions to allow a user to customize the arrangement of the first and second content on the display portions.

In still other embodiments, the electronic device 100 detects movement of a user in the environment of the electronic device using facial recognition technology to track the user's gaze and determine which content they are actively viewing. The electronic device 100 can even be configured to move of the content between display portions so as to provide a smooth transition animation when moving the content from one display portion to another. This smooth transition animation can include a fade-in and fade-out effect during the content movement. In still other embodiments, the electronic device 100 can detect the user's emotions and can adjust the content based on the detected emotions. In one or more embodiments, in addition to just "switching," the electronic device 100 can customize of the arrangement of the first and second content by resizing and repositioning the content on the display portions. Other embodiments will be obvious to those of ordinary skill in the art having the benefit of this disclosure.

Figure 5:
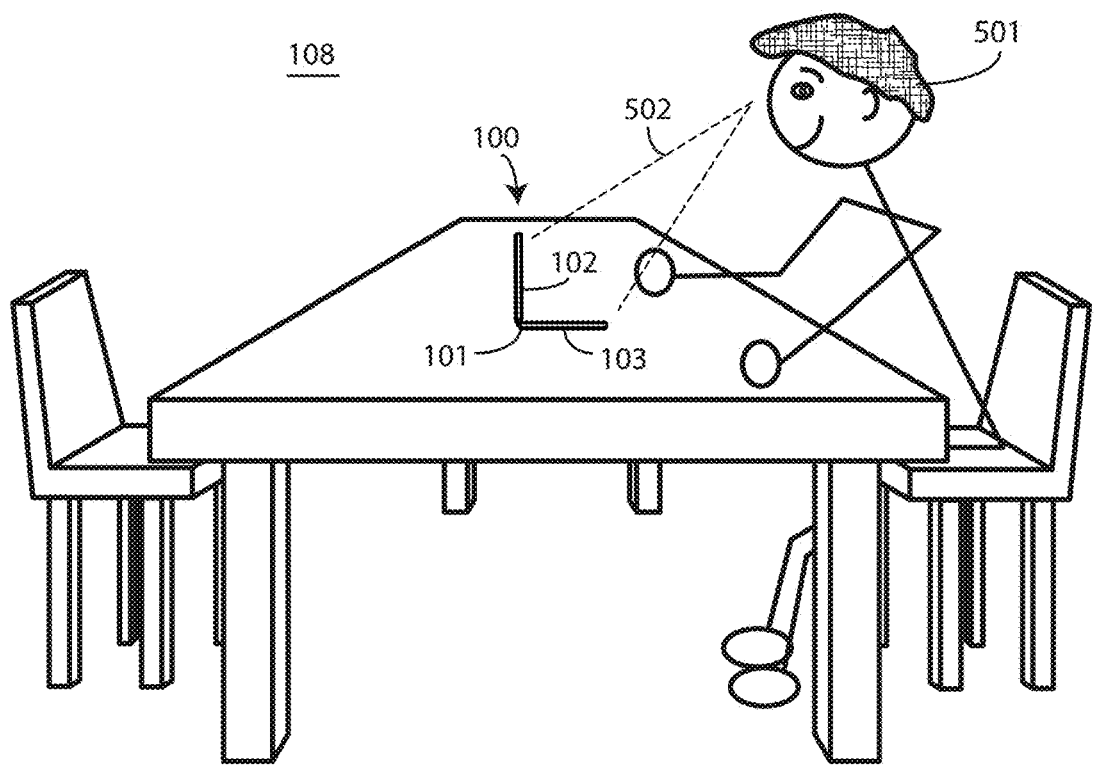
FIG. 5 illustrates a user, situated in a first position, using one explanatory electronic device in accordance with one or more embodiments of the disclosure.

Turning now to FIG. 5, illustrated therein is the explanatory electronic device 100 described above with reference to FIGS. 1-4. As shown, the electronic device 100 is configured in in a laptop geometric form factor with the first device housing 102 and the second device housing 103 defining roughly an orthogonal angle. Moreover, the electronic device 100 is positioned on a surface within an environment 108, as might be the case if the user 501 were engaged in a videoconference with the videoconference participants positioned on a first display portion coupled to the first device housing 102.

As shown in FIG. 5, a user 501 is depicted interacting with the electronic device 100, which is composed of a first device housing 102 and a second device housing 103 connected by a hinge 101. The user 501 is seated at a table, and the gaze cone 502 originating from the user 501 is directed towards the electronic device 100, indicating the user's line of sight and focus on the electronic device 100.

The electronic device 100 is arranged such that the first device housing 102 is oriented in a substantially vertical position, while the second device housing 103 is placed in a substantially horizontal position, resembling the typical setup of a laptop with a screen and keyboard. This configuration allows the user 501 to view and interact with the display portions attached to each device housing. The gaze cone 502 illustrates that the user 501 has a more direct line of sight to the first device housing 102, which is positioned more orthogonally to the user's gaze compared to the second device housing 103.

Figure 6:
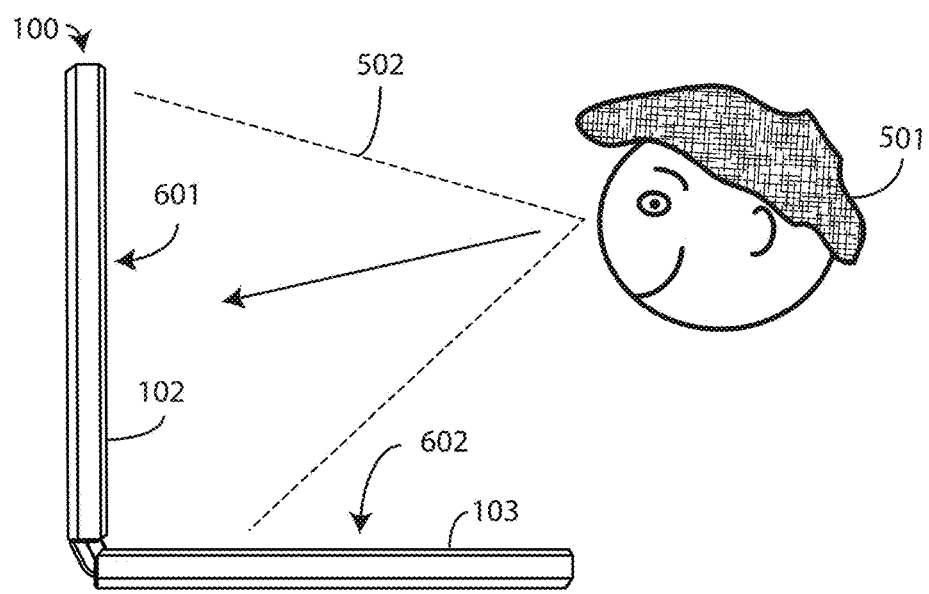
FIG. 6 also illustrates the user using one explanatory electronic device in accordance with one or more embodiments of the disclosure.

FIG. 6 provides a side view of the electronic device 100, further illustrating the orientation of the first device housing 102 and the second device housing 103. The first display portion 601 of the flexible display is attached to the first device housing 102, and the second display portion 602 of the flexible display is attached to the second device housing 103. The user 501 is shown with the gaze cone 502 indicating the direction of the user's gaze relative to the electronic device 100. The gaze cone 502 intersects the first display portion 601 of the flexible display more directly, suggesting that the user 501 has a clearer and more focused view of the content displayed on this portion of the device.

The arrangement of the electronic device 100 and the orientation of the user's gaze as depicted in FIGS. 5 and 6 highlight the user's interaction with the device when the device is in a laptop geometric form factor, and with the user 501 seated in a chair while the second device housing 103 of the electronic device 100 sits on a table. The visibility and accessibility of the content on the first and second portions of the flexible display are influenced by the user's position and the angle at which the device housings are set. These figures underscore the significance of the device's design in facilitating an optimal viewing experience for the user 501, particularly when engaging with split-screen content in various use case scenarios.

Figure 7:
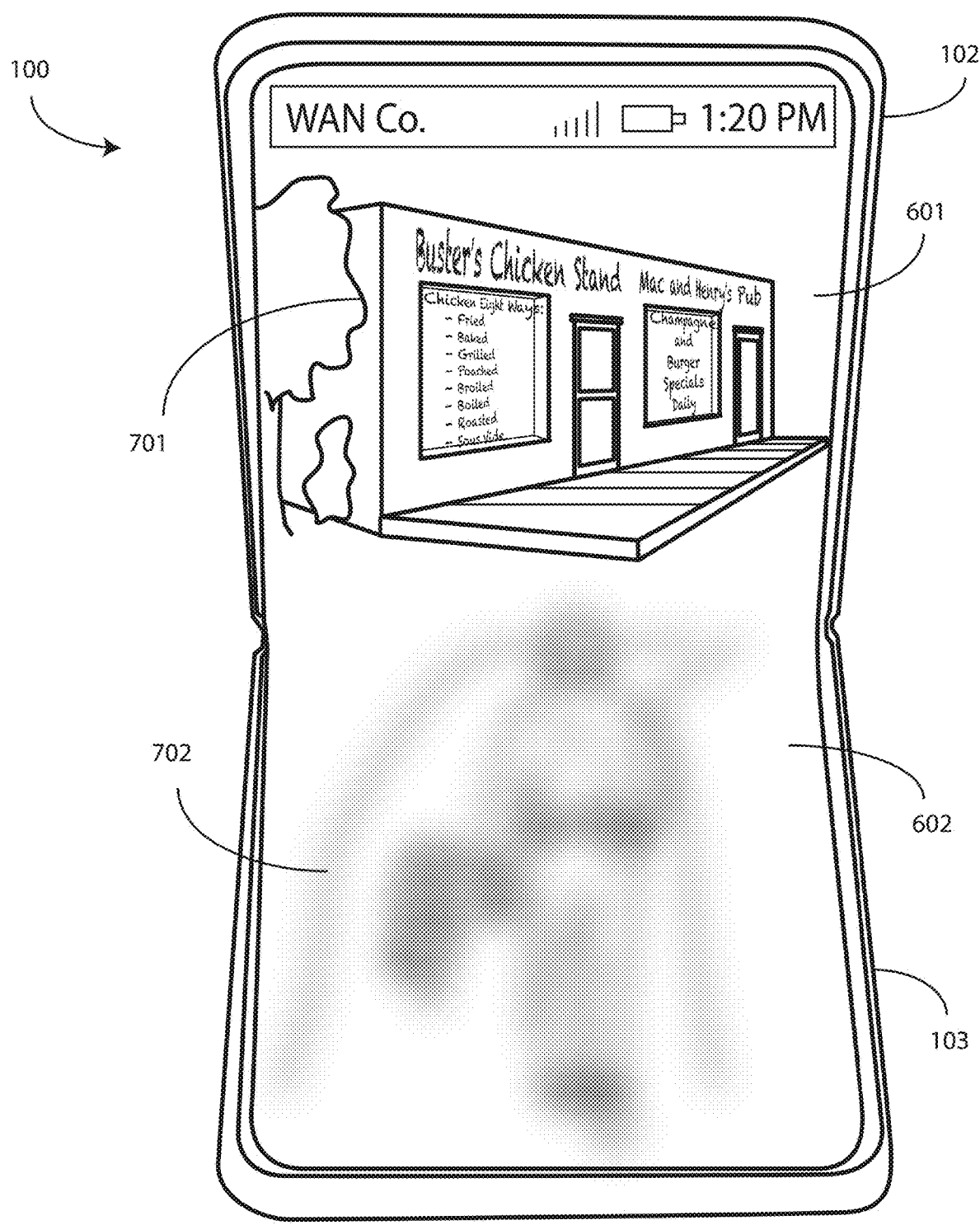
FIG. 7 illustrates one explanatory user interface for an electronic device configured in accordance with one or more embodiments of the disclosure.

Turning now to FIG. 7, illustrated therein is the electronic device 100 from FIGS. 5-6 as seen by the user with the first device housing 102 and the second device housing 103 bent so that the electronic device 100 is in the laptop geometric form factor. As shown, the flexible display of the electronic device 100 includes a first display portion 601 of the flexible display and a second display portion 602 of the flexible display. The first display portion 601 of the flexible display presents first content 701, while the second display portion 602 of the flexible display presents second content 702.

Since the user (501) has a better view of the first device housing 102, in one or more embodiments the one or more processors of the electronic device 100 designate the first content 701 as a portion of interest. Said differently, since the user (501) of FIGS. 5-6 was in the "first display portion 601" viewing orientation, in one or more embodiments the one or more processors of the electronic device 100 present the second content 702 in a dimmer resolution than the first content 701.

The first content 701 on the first display portion 601 of the flexible display is therefore clearly visible and appears to be the focus of the user's attention, as indicated by the context provided. In this illustrative embodiment, this first content 701 is displayed with a higher resolution, signifying its status as the "portion of interest." The second content 702 on the second display portion 602 of the flexible display is depicted in a dimmed and, optionally, a blurred manner, suggesting that the second content 702 is of secondary importance to the user at this moment.

The electronic device 100 utilizes one or more sensors to determine the orientation of the user's gaze relative to the electronic device 100. These sensors have ascertained that the user (501) is more directly viewing the first display portion 601 of the flexible display due to the user's seated position at the table, thereby prompting the one or more processors within the electronic device 100 to designate the first content 701 as the portion of interest. The second content 702 is then rendered in a dimmer resolution to reflect the lower priority in the user's current field of view.

This figure exemplifies the electronic device's capability to dynamically adjust content presentation based on the user's gaze and position, enhancing the user experience by ensuring that the content of interest is prominently displayed. The dimming of the second content 702 serves to minimize distractions and focus the user's attention on the first content 701. This feature is particularly useful in scenarios where the electronic device 100 is used in a split-screen mode, allowing for efficient multitasking while maintaining clarity and visibility of the content deemed most relevant by the user.

Thus, as shown in FIG. 7, the electronic device 100 comprises a first device housing 102 and a second device housing 103. The first device housing 102 is coupled to the second device housing 103 by a hinge (101) such that the first device housing 102 is pivotable about the hinge (101) relative to the second device housing 103 between a closed position and an axially displaced open position.

The hinge (101) enables the electronic device 100 to maintain a partially deformed geometric form factor between the axially displaced open position and the closed position. The partially deformed geometric form factor comprises the first device housing 102 being pivoted about the hinge (101) relative to the second device housing 103 to an angle of between seventy-five and one hundred and five degrees, inclusive. In this illustrative embodiment, the first device housing 102 is pivoted relative to the second device housing 103 so as to be substantially orthogonal relative to the second device housing 103.

The electronic device 100 further includes a first display portion 601 of the flexible display coupled to the first device housing 102 and a second display portion 602 of the flexible display coupled to the second device housing 103. In this illustrative embodiment, the first display portion 601 of the flexible display and the second display portion 602 of the flexible display comprise portions of a singular, unitary, flexible display 105 coupled to the first device housing 102 and the second device housing 103 and spanning the hinge (101). The first display portion 601 of the flexible display presents first content 701, and the second display portion 602 of the flexible display presents second content 702. In this illustrative embodiment, the first content 701 and the second content 702 are different.

The electronic device 100 is equipped with one or more sensors operable to determine the partially deformed geometric form factor of the electronic device 100 between the axially displaced open position and the closed position. These sensors can include a viewing angle detector (111) that detects a user's position relative to the first device housing 102 and the second device housing 103 of the electronic device 100. The viewing angle detector (111) can further be capable of determining whether a person situated within an environment of the electronic device 100 is in a first display portion 601 viewing orientation relative to the electronic device 100 or a second display portion 602 viewing orientation relative to the electronic device 100. In one or more embodiments, this determination includes determining the person is in the first display portion 601 viewing orientation when a central axis of a gaze cone of the person is oriented closer to perpendicular with the first display portion 601 than with the second display portion 602.

One or more processors (112) are operable with the one or more sensors (119), the first display portion 601 of the flexible display, and the second display portion 602 of the flexible display. The one or more processors 112 are responsible for designating the first content 701 as a portion of interest when the person is in the first display portion 601 viewing orientation. The second content 702 can then be presented in a dimmer resolution than the portion of interest to ensure that the user's focus remains on the first content 701, which is designated as the portion of interest.

As will be described below with reference to FIGS. 8-11, in one or more embodiments when the movement of a person viewing one or both of the first content 701 and/or the second content 702 within an environment of the electronic device 100 meets a predefined criterion, the one or more processors (112) move the first content 701 from the first display portion 601 of the flexible display to the second display portion 602 of the flexible display and the second content 702 from the second display portion 602 of the flexible display to the first display portion 601 of the flexible display. The predefined criterion can take various forms, examples of which include the person standing up, moving their head above the second device housing 103, moving from a display portion viewing orientation relative to the electronic device 100 to another display portion viewing orientation relative to the electronic device 100, making a gesture in three-dimensional space, or increasing a viewing angle relative to the second display portion 602 of the flexible display and decreasing a viewing angle relative to the first display portion 601 of the flexible display by at least a predefined viewing angle threshold. Other predefined criteria will be obvious to those of ordinary skill in the art having the benefit of this disclosure.

Figure 8:
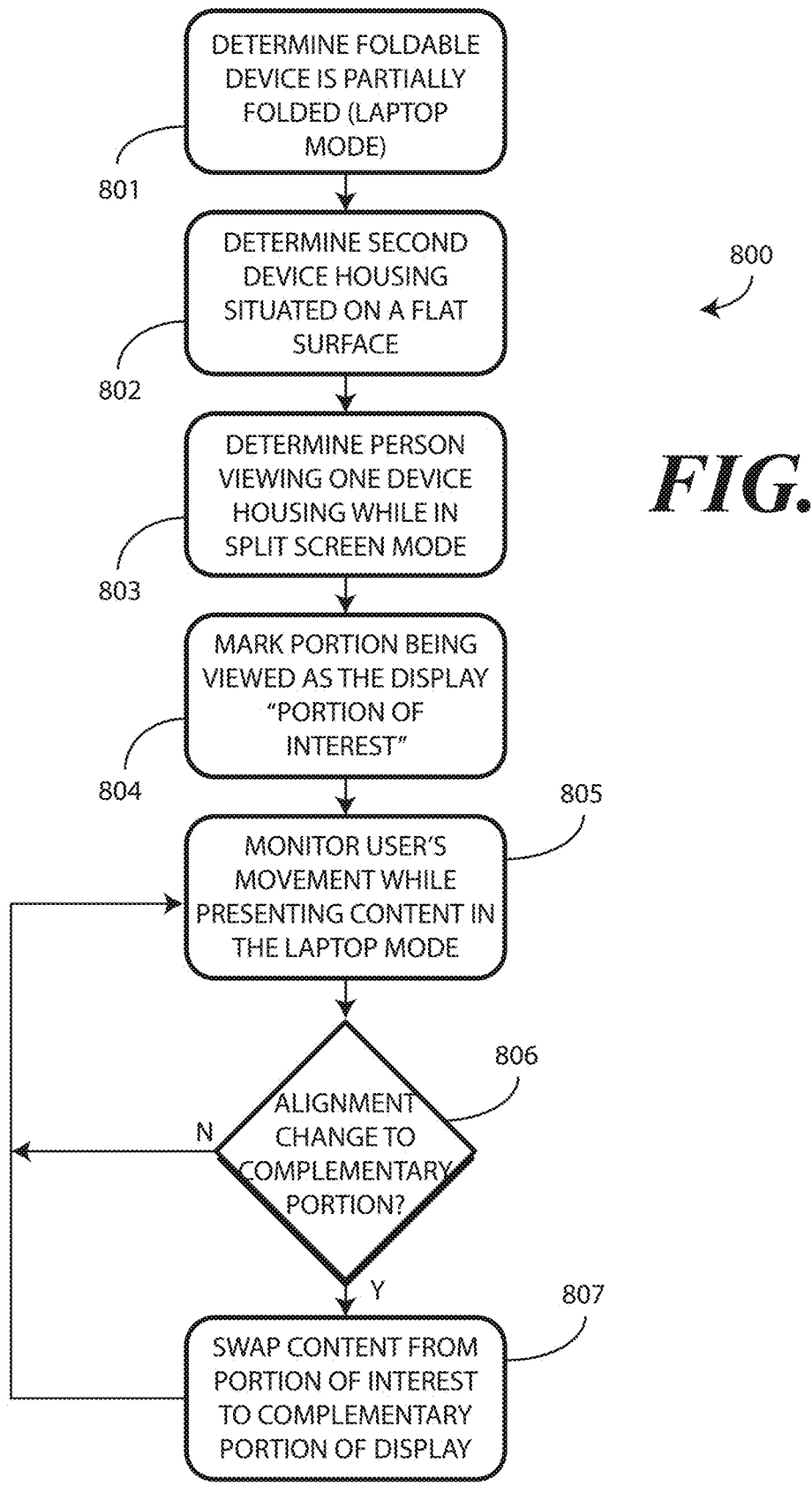
FIG. 8 illustrates one explanatory method in accordance with one or more embodiments of the disclosure.

Turning now to FIG. 8, illustrated therein is one explanatory method 800 describing this operation. Beginning at step 801, the method 800 comprises detecting, with one or more sensors, a partially deformed geometric form factor defined by a first device housing of a deformable electronic device being pivoted about a hinge of the deformable electronic device relative to a second device housing between an axially displaced open position and a closed position. Illustrating by example, in one or more embodiments step 801 comprises determining that the first device housing has been pivoted about the hinge relative to the second device housing to an angle of between seventy-five and one hundred and five degrees, inclusive. Other partially deformed geometric ranges between the axially displaced open position and the closed position will be obvious to those of ordinary skill in the art having the benefit of this disclosure.

At step 802, the method 800 optionally determines that the electronic device is situated on a flat surface, with an exterior surface of one of the first device housing or the second device housing abutting the surface. Illustrating by example, in FIG. 5 the second device housing (103) of the electronic device (100) was abutting the surface of a table.

At step 803, one or more processors of the electronic device present first content on a display portion spanning a major surface of the first device housing and second content on another display portion spanning a major surface of the second device housing. In one or more embodiments, the first content and the second content are different, resulting in the content presentation being in a "split screen" mode.

In one or more embodiments, step 803 also comprises one or more sensors of the electronic device determining whether a person situated within an environment of the electronic device is in a display portion viewing orientation relative to the electronic device where the first display portion can more readily be seen or another display portion viewing orientation relative to the electronic device where a second display portion can more easily be seen. For instance, step 803 can determine the person is in the display portion viewing orientation when a central axis of a gaze cone of the person is oriented closer to normal with the display portion than with the other display portion.

Step 804 can then mark a portion of interest for the more readily viewable portion. Illustrating by example, in one or more embodiments step 804 comprises designating the first content being presented on the first display portion as a portion of interest when the person is in the display person viewing orientation, and vice versa. In one or more embodiments, step 804 can optionally comprise presenting the second content in a dimmer resolution than the portion of interest when the first content constitutes the portion of interest, and vice versa.

Step 805 then detects movement of the person viewing one or both of the first content and/or the second content within the environment of the electronic device. Decision 806 then determines whether the movement meets a predefined criterion. The predefined criterion can vary.

In one or more embodiments, the predefined criterion comprises the person standing up. In other embodiments, the predefined criterion comprises the person moving their head above the second device housing. In still other embodiments, the predefined criterion comprises the person moving from a display portion viewing orientation relative to the electronic device to another display portion viewing orientation relative to the electronic device.

In still other embodiments, the predefined criterion comprises the person making a gesture in three-dimensional space. In still other embodiments, the predefined criterion comprises the person increasing a viewing angle relative to the another display portion and decreasing a viewing angle relative to the another display portion by at least a predefined viewing angle threshold. It should be noted that these predefined criteria are illustrative only and can be used alone or in combination. Moreover, other predefined criteria will be obvious to those of ordinary skill in the art having the benefit of this disclosure.

Where the movement of the person meets the predefined criterion, step 807 comprises moving, with the one or more processors of the electronic device, the first content from the display portion to the other display portion and the second content from the other display portion to the display portion. In effect, in one or more embodiments step 807 would reverse the presentations of the first content (701) and the second content (702) shown above in FIG. 7 when the user's gaze cone, for example, became oriented more orthogonally with the second display portion (602) than the first display portion (601).

Figure 9:
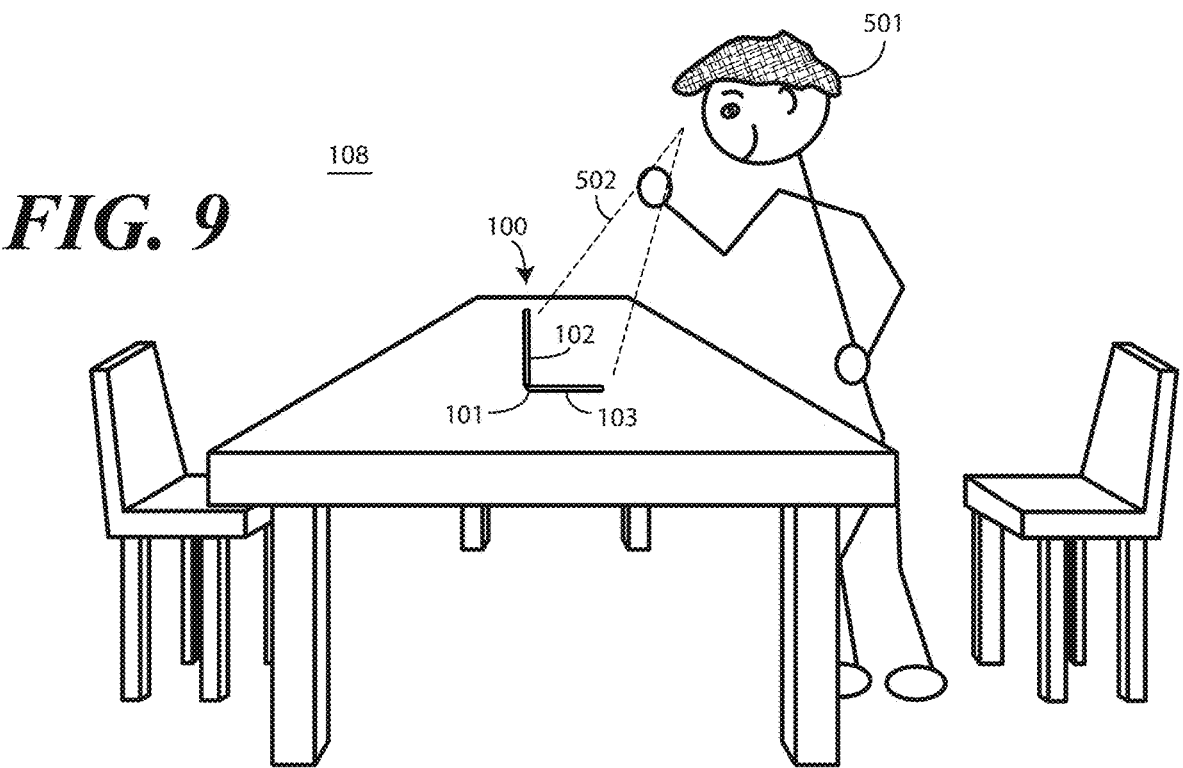
FIG. 9 illustrates the user, situated in a second position, using one explanatory electronic device in accordance with one or more embodiments of the disclosure.

Turning now to FIG. 9, illustrated therein is the electronic device 100 of FIG. 5, once again in a laptop geometric form factor and sitting on a table. However, FIG. 9 shows electronic device 100 in an environment 108 with user 501 having stood up from a seated position. The electronic device 100 comprises a first device housing 102 and a second device housing 103 connected by a hinge 101. The electronic device 100 is positioned in a partially open state, resembling a laptop mode, where the first device housing 102 is oriented at an angle relative to the second device housing 103, which is placed flat on the surface of a table.

The user 501 is depicted standing next to the table, with gaze cone 502 extending from the user's eyes towards the electronic device 100. The gaze cone 502 indicates the user's field of vision and is oriented more orthogonally with the second device housing 103 than the first device housing 102 due to the fact that the user 501 is standing now, rather than sitting. This change in the user's position and the orientation of gaze cone 502 relative to the electronic device 100 triggers a response in the device's operational behavior.

Figure 10:
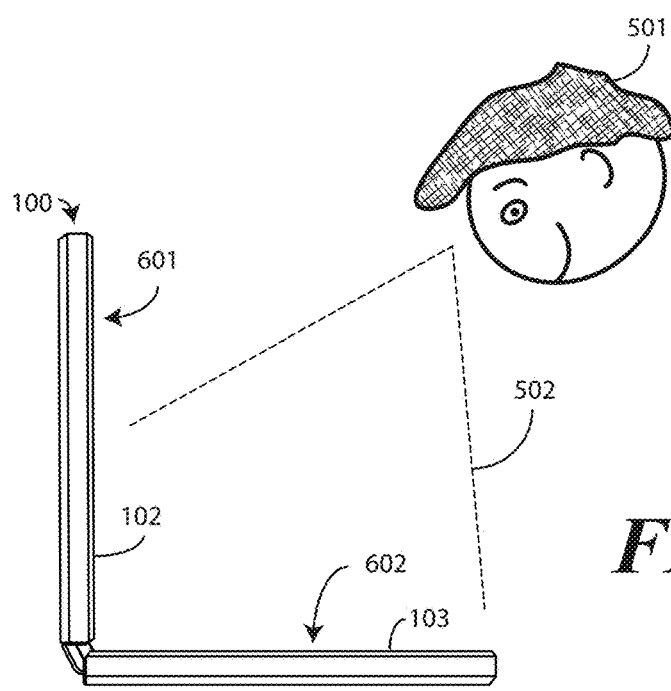
FIG. 10 also illustrates the user using one explanatory electronic device in accordance with one or more embodiments of the disclosure.

FIG. 10 provides a closer view of the electronic device 100, illustrating the relationship between the user's gaze cone 502 and the device's display portions. The first display portion 601 of the flexible display is coupled to the first device housing 102 and is positioned vertically, while the second display portion 602 of the flexible display is coupled to the second device housing 103 and is positioned horizontally. The central vector of the gaze cone 502 is shown to be closer to perpendicular with the second display portion 602 than with the first display portion 601, indicating the user's current focus on the second display portion 602.

In response to the user's movement and the realignment of gaze cone 502, the one or more processors within electronic device 100 execute an automatic content swap between the first display portion 601 and the second display portion 602. This swap ensures that the content of interest is presented on the display portion that is now within the user's primary field of vision. Additionally, the processors may dim the content on the other display portion to enhance the user's focus on the active content. This automatic adjustment of content presentation is based on the detection of the user's movement in three-dimensional space relative to the electronic device 100, which has increased the viewing angle relative to the second display portion 602 to between forty-five and one hundred and thirty-five degrees.

Figure 11:
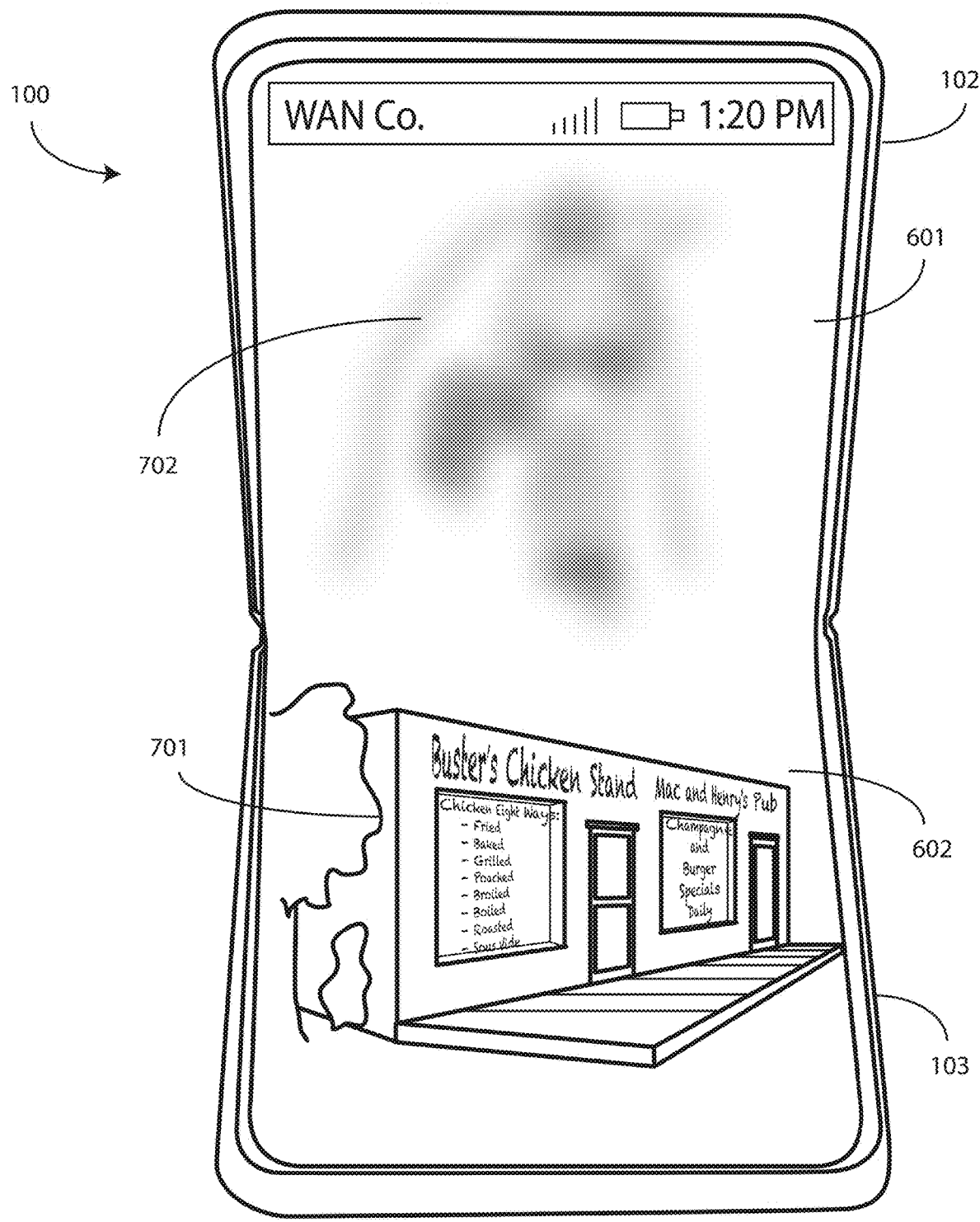
FIG. 11 illustrates one explanatory user interface for an electronic device configured in accordance with one or more embodiments of the disclosure.

Turning now to FIG. 11, illustrated therein is the electronic device 100 as viewed by the user (501) of FIGS. 9-10, and after the content swapping operation. Once again, the electronic device 100 includes a hinge (101), a first device housing 102, a second device housing 103, a first display portion 601 of the flexible display, and a second display portion 602 of the flexible display. Since the content has been swapped, the first display portion 601 now presents the second content 702, while the second display portion 602 presents the first content 701. The electronic device 100 is depicted in an open state where the first device housing 102 and the second device housing 103 are unfolded and laid flat to present the first display portion 601 of the flexible display and the second display portion 602 of the flexible display, which together form the continuous surface of the flexible display.

The first device housing 102 is connected to the second device housing 103 via the hinge (101), allowing the electronic device 100 to transition between various form factors. The first display portion 601 of the flexible display is coupled to the first device housing 102 and displays the second content 702, which can now less readily be seen by the user (501) due to their standing posture. Meanwhile, the second display portion 602 of the flexible display is coupled to the second device housing 103 and displays the first content 701.

The first content 701 is shown on the second display portion 602, which occupies the lower region of the electronic device 100, suggesting a focused viewing area for the user. The second content 702 is displayed on the second display portion 602 of the flexible display, which occupies the upper region of the electronic device 100, and is depicted in a blurred manner, indicating that the second content 702 is of secondary focus or importance at the moment. This arrangement exemplifies the electronic device's capability to prioritize content based on user interaction or predefined criteria.

Accordingly, by comparing FIGS. 5-7 and 9-11, a method is illustrated that detects, with a first sensor, a first device housing 102 of the electronic device 100 positioned in a partially open position relative to a second device housing 103 coupled to the first device housing 102 by a hinge (101). At least a second sensor detects whether a person situated within an environment of the electronic device 100 is viewing a first display portion 601 coupled to the first device housing 102 or the second display portion 602 coupled to the second device housing 103 while the electronic device 100 is in a dual-content presentation mode of operation.

At least a third sensor detects the person moving in three-dimensional space relative to the electronic device 100. One or more processors then automatically swap content being presented on the first display portion 601 for other content being presented on the second display portion 602, and vice versa, in response to the person moving in the three-dimensional space relative to the electronic device 100.

While movement is one trigger to cause such swapping, embodiments of the disclosure contemplate that a user may want to use a gesture to manually swap content as well. Illustrating by example, imagine a user named Buster who is deeply engrossed in a video podcast on his foldable electronic device. The device is in a laptop geometric form factor, with the upper portion of the screen displaying the video and the lower portion showing his messaging app. Buster is comfortably seated at his desk, and the device's sensors have already determined that his gaze is primarily focused on the upper portion of the screen. However, Buster suddenly needs to check a message on the lower portion of the screen. Instead of standing up or bending forward to change his viewing angle, Buster simply makes a quick hand gesture in the air. Instantly, the content on the upper and lower portions of the screen swap places, bringing the messaging app into clear view without disrupting his comfortable seated position.

This scenario highlights why a user like Buster may prefer to use a gesture in three-dimensional space to cause the content to swap display portions rather than moving his entire body. The use of gestures offers a level of convenience and efficiency that physical movement cannot match. For instance, making a gesture is less physically demanding and can be done almost instantaneously. This is particularly advantageous in situations where the user is in a relaxed or fixed position, such as sitting at a desk or lying on a couch. The ability to control the device with a simple hand movement allows the user to maintain their comfort while still interacting with the device effectively.

Moreover, the use of gestures can significantly enhance the user experience by providing a more intuitive and seamless way to interact with the device. Gestures can be designed to be natural and easy to remember, making the interaction feel more fluid and less disruptive. For example, a simple swipe in the air could be used to swap the content, while a circular motion could be used to scroll through a list. These intuitive gestures can make the device feel more responsive and attuned to the user's needs, thereby improving overall satisfaction.

Another advantage of using gestures over moving the entire body is the reduction in interruptions to the user's workflow or leisure activities. In Buster's case, standing up or bending forward to change his viewing angle would not only be physically inconvenient but also mentally disruptive. It would break his focus and potentially cause him to lose track of the video podcast he was watching. In contrast, a quick gesture allows him to continue his activity without any significant interruption, thereby maintaining his flow and productivity.

In summary, the use of gestures in three-dimensional space to control content swapping on a foldable electronic device offers numerous advantages over physical movement. It provides a more convenient, efficient, and intuitive way to interact with the device, enhances user comfort, and minimizes disruptions to the user's activities. These benefits make gestures an appealing option for users who seek a seamless and enjoyable interaction with their electronic devices.

Figure 12:
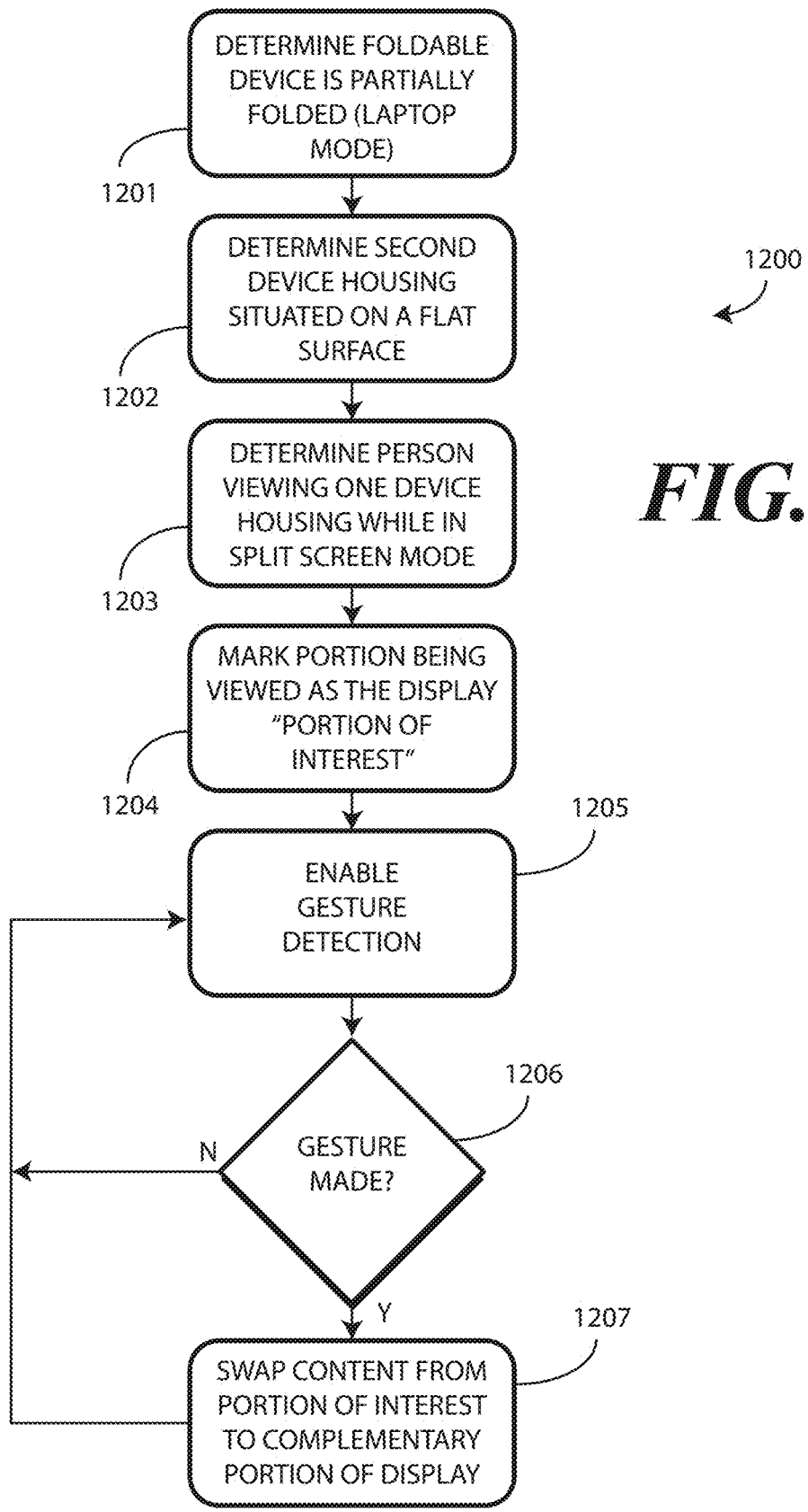
FIG. 12 illustrates another explanatory method in accordance with one or more embodiments of the disclosure.

Turning now to FIG. 12, illustrated therein is one explanatory method 1200 for using a gesture, rather than torso movement, to control a content presentation in accordance with one or more embodiments of the disclosure. Beginning at step 1201, the method 1200 comprises detecting, with one or more sensors, a partially deformed geometric form factor defined by a first device housing of a deformable electronic device being pivoted about a hinge of the deformable electronic device relative to a second device housing between an axially displaced open position and a closed position.

Illustrating by example, in one or more embodiments step 1201 comprises determining that the first device housing has been pivoted about the hinge relative to the second device housing to an angle of between seventy-five and one hundred and five degrees, inclusive. Other partially deformed geometric ranges between the axially displaced open position and the closed position will be obvious to those of ordinary skill in the art having the benefit of this disclosure.

At step 1202, the method 1200 optionally determines that the electronic device is situated on a flat surface, with an exterior surface of one of the first device housing or the second device housing abutting the surface. At step 1203, one or more processors of the electronic device present first content on a display portion spanning a major surface of the first device housing and second content on another display portion spanning a major surface of the second device housing. In one or more embodiments, the first content and the second content are different, resulting in the content presentation being in a "split screen" mode.

In one or more embodiments, step 1203 also comprises one or more sensors of the electronic device determining whether a person situated within an environment of the electronic device is in a display portion viewing orientation relative to the electronic device where the first display portion can more readily be seen or another display portion viewing orientation relative to the electronic device where a second display portion can more easily be seen. For instance, step 1203 can determine the person is in the display portion viewing orientation when a central axis of a gaze cone of the person is oriented closer to normal with the display portion than with the other display portion.

Step 1204 can then mark a portion of interest for the more readily viewable portion. Illustrating by example, in one or more embodiments step 1204 comprises designating the first content being presented on the first display portion as a portion of interest when the person is in the display person viewing orientation, and vice versa. In one or more embodiments, step 1204 can optionally comprise presenting the second content in a dimmer resolution than the portion of interest when the first content constitutes the portion of interest, and vice versa.

In contrast to step (805) of FIG. 8, which monitored a user's movement, step 1205 enables gesture detection. This step 1205 involves the use of sensors to detect specific user gestures made in three-dimensional space. Decision 1206 then determines whether a predefined gesture has been made in three-dimensional space. If the predefined gesture is detected, the method proceeds to step 1207, where the content being presented on the first display portion is swapped with the content being presented on the second display portion, and vice versa. This gesture-based interaction provides an additional layer of user engagement and control over the content presentation on the foldable electronic device, enhancing the overall user experience by allowing for intuitive and seamless content management.

Figure 13:
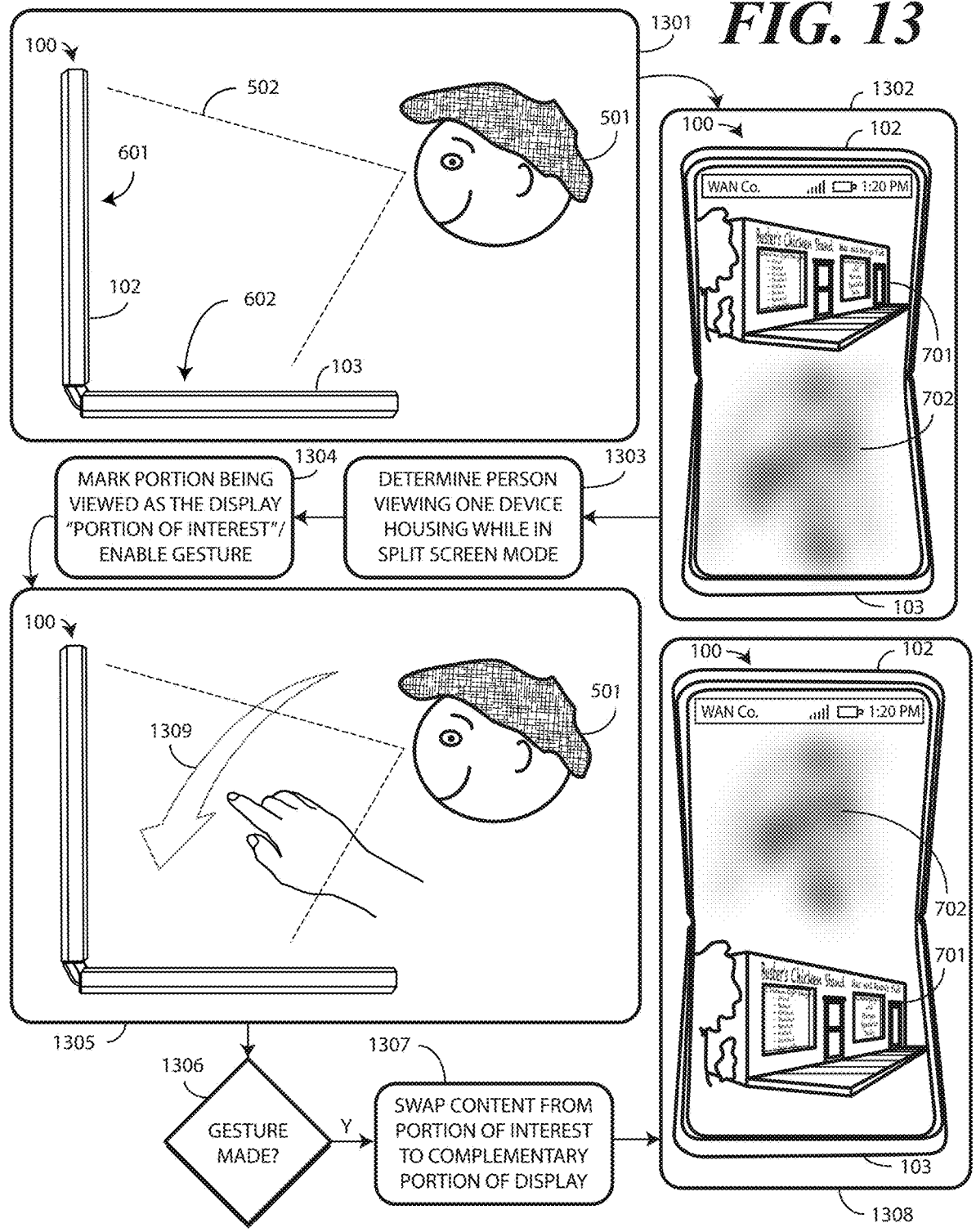
FIG. 13 illustrates one or more explanatory method steps in accordance with one or more embodiments of the disclosure.

The method 1200 of FIG. 12 is visually illustrated in the method steps of FIG. 13. Turning now to FIG. 13, at step 1301 electronic device 100 is being used by user 501, where first content 701 is being presented on first display portion 601 of the flexible display spanning first device housing 102. Second content 702 is presented on second display portion 602 of the flexible display spanning second device housing 103. The gaze cone 502 of user 501 is directed more toward first device housing 102, indicating the user's focus on the content displayed there.

What the user sees is shown at step 1302, and the current mode of operation is determined by one or more processors of the electronic device 100 at step 1303. Step 1304 designates the first content 701 as the portion of interest and enables gesture detection. Said differently, at step 1304, the method involves marking the portion of the display being viewed by user 501 as the "portion of interest" and enabling a gesture for interaction. This step 1304 designates first content 701 as the focal point of user interaction based on the orientation of gaze cone 502 towards first device housing 102.

Step 1303 shows the determination of user 501 viewing one device housing while in split screen mode. This step is for understanding which content user 501 is actively engaging with and thus be considered the "portion of interest."

At step 1305, user 501 makes a predefined gesture 1309, which is detected by electronic device 100. This gesture serves as an input command, triggering the content swapping process as part of the method's interactive features.

Upon detecting the predefined gesture at decision 1306, the method proceeds to step 1307, where the one or more processors of electronic device 100 swap first content 701 and second content 702. This action effectively transfers the content from the portion of interest to the complementary portion of the flexible display, adapting to the change in user's interaction with electronic device 100.

The resulting output of this content swap is shown at step 1308, where the first content 701, initially on first display portion 601 of the flexible display, is now displayed on second display portion 602 of the flexible display. This swap ensures that the content of interest aligns with the user's current focus and interaction with electronic device 100, enhancing the user experience by providing seamless content accessibility.

Figure 14:
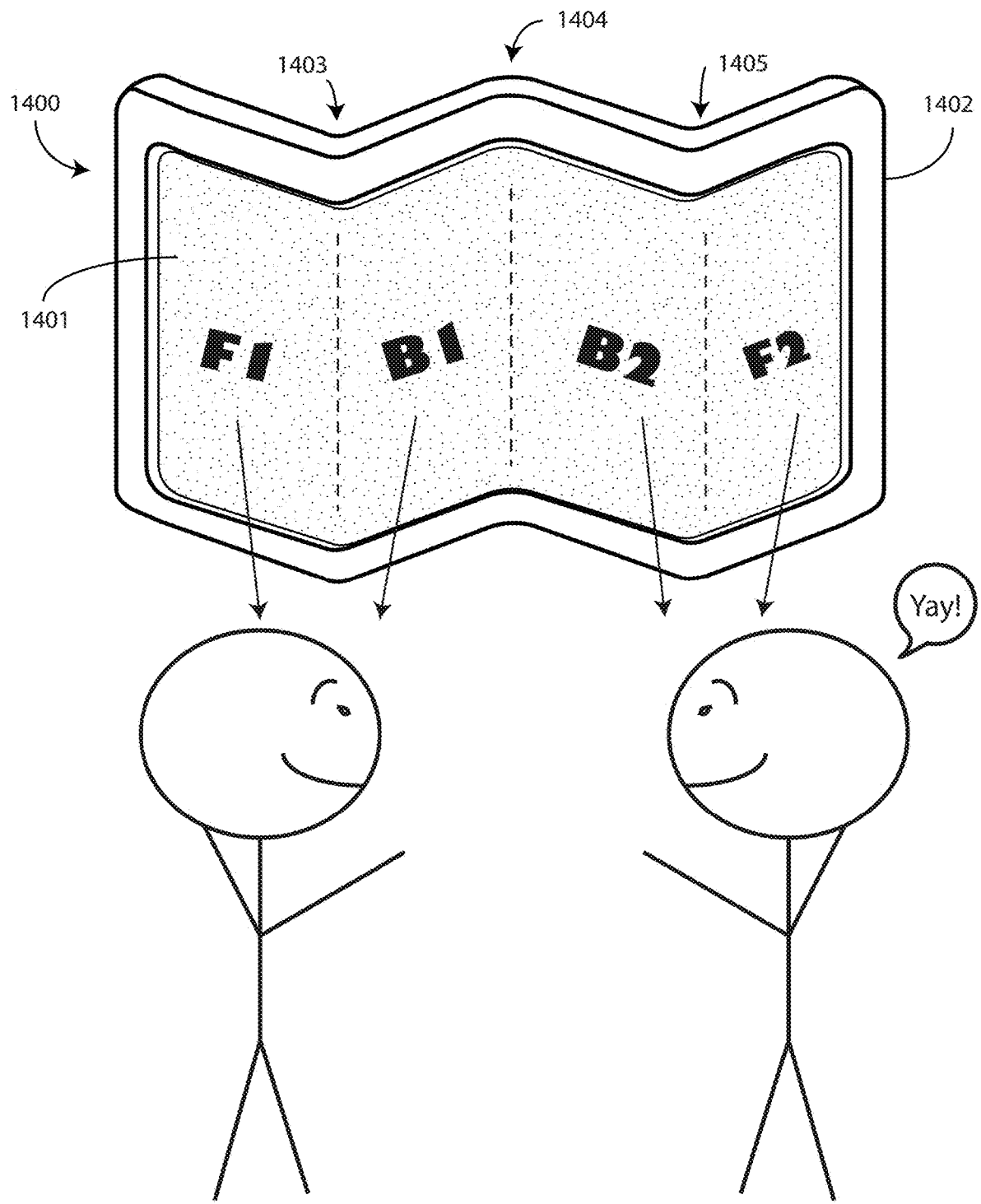
FIG. 14 illustrates two users using another explanatory electronic device configured in accordance with one or more embodiments of the disclosure.

Turning now to FIG. 14, illustrated therein is another electronic device 1400 configured in accordance with one or more embodiments of the disclosure. Rather than having a hinge, the electronic device 1400 of FIG. 14 has a deformable device housing 1402 allowing the electronic device 1400 to be deformed with one or more bends 1403,1404, 1405. A flexible display 1401 spans a major surface of the electronic device 1400 as shown. Since the electronic device 1400 can be deformed with multiple bends 1403,1404,1405, this allows two users to each watch portions of the flexible display 1401 in a split screen mode.

One or more sensors of the electronic device 1400 are operable to detect multiple bends occurring in the device housing 1402. When multiple bends are present in the electronic device 1400, the one or more sensors can monitor the movement of each person relative to their split screen orientation. When the users move, the one or more processors can perform swapping operations as previously described.

Thus, FIG. 14 shows an electronic device 1400 with a deformable device housing 1402 that allows for multiple bends 1403,1404,1405, enabling a flexible display 1401 to span a surface of the electronic device 1400. The flexible display 1401 is configured to present content in at least two split screen modes, where different content can be viewed by two users.

In FIG. 14, F1 represents the first content for the first user, while B1 represents the second content, which may be dimmed or blurred. Similarly, F2 represents the first content for the second user, while B2 represents the second content that may also be dimmed or blurred.

Blurring or dimming the second content that is not directly within the gaze cone of the particular user can be beneficial for several reasons. First, it helps to reduce visual clutter and distractions, allowing the user to focus more effectively on the primary content of interest. This can enhance the overall viewing experience by ensuring that the user's attention is directed towards the most relevant information. Second, dimming or blurring the secondary content can also help to conserve battery life and reduce power consumption, as the flexible display 1401 does not need to render the secondary content at full brightness or resolution. This feature is particularly useful in scenarios where the electronic device 1400 is being used for extended periods. Overall, the ability to dynamically adjust the visibility of secondary content based on the user's gaze and interaction with the device provides a more intuitive and efficient user experience.

The electronic device 1400 includes multiple display portions, delineated by dashed lines, enabling each capable of presenting distinct content to the respective users. The deformable device housing 1402 facilitates the creation of bends 1403,1404,1405, which define the viewing areas for the first user and the second user. These bends allow each user to view their respective content on the flexible display 1401 from an optimal angle, enhancing the viewing experience in a shared environment.

One or more sensors integrated within the electronic device 1400 are capable of detecting the presence of multiple bends 1403,1404,1405 in the device housing 1402. These sensors play a role in monitoring the movement of each user relative to their split screen orientation. As the first user and the second user begin to move relative to the electronic device 1400, the sensors detect these movements and relay the information to one or more processors within the electronic device 1400.

In response to the detected movements of the first user and the second user, the one or more processors execute content swapping operations. These operations ensure that the content of interest remains within the optimal field of view for each user. For instance, if the first user shifts position in such a way that the right display portion of his split-screen presentation becomes more directly in the line of sight, the processors may swap the content from the left display portion to the right display portion. The same operation, in reverse, can happen for the second user since his split-screen presentation is reversed in the illustrative embodiment of FIG. 14.

The content swapping mechanism is designed to be seamless and intuitive, minimizing disruption to the viewing experience. This feature is particularly advantageous when two users are engaged in viewing different content on the same electronic device 1400 and require the content to follow their gaze and position changes. The ability to dynamically adjust the content presentation based on user movement enhances the usability of the foldable electronic device 1400 in various scenarios, such as collaborative work, gaming, or multimedia consumption. Overall, the electronic device 1400 depicted in FIG. 14 exemplifies an innovative approach to split screen content management on a foldable device, providing a flexible and user-centric solution for shared viewing experiences.

Figure 15:
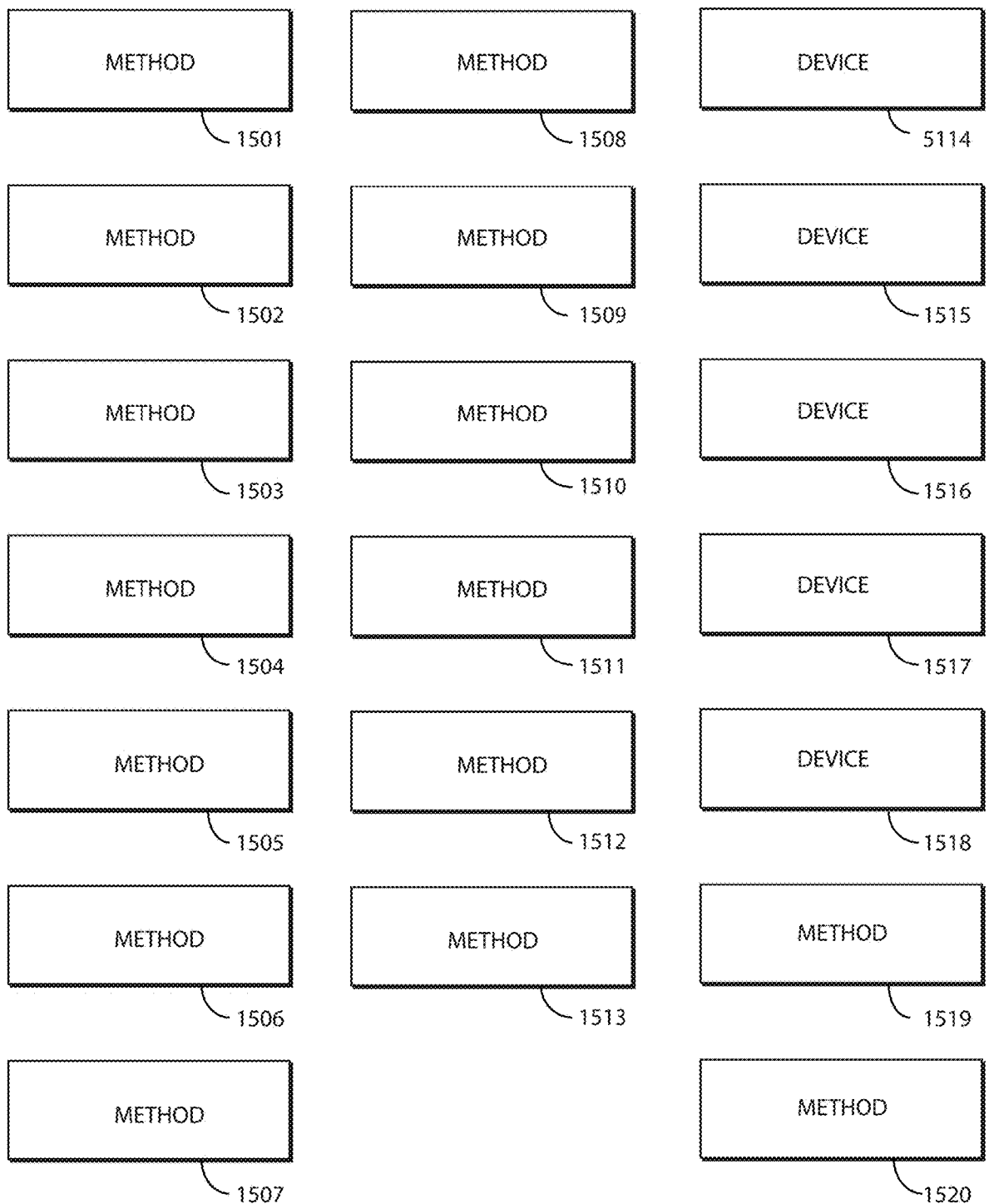
FIG. 15 illustrates various embodiments of the disclosure.

Turning now to FIG. 15, illustrated therein are various embodiments of the disclosure. The embodiments of FIG. 15 are shown as labeled boxes in FIG. 15 due to the fact that the individual components of these embodiments have been illustrated in detail in FIGS. 1-14, which precede FIG. 15. Accordingly, since these items have previously been illustrated and described, their repeated illustration is no longer essential for a proper understanding of these embodiments. Thus, the embodiments are shown as labeled boxes.

At 1501, a method in an electronic device comprises detecting, with one or more sensors, a partially deformed geometric form factor defined by a first device housing of the electronic device being pivoted about a hinge relative to a second device housing of the electronic device partially between an axially displaced open position and a closed position. At 1501, the method comprises presenting, with one or more processors, first content on a display portion spanning a major surface of the first device housing and second content on another display portion spanning a major surface of the second device housing, wherein the first content and the second content are different.

At 1501, the method also comprises also detecting, with one or more other sensors, movement of a person viewing one or both of the first content and/or the second content within an environment of the electronic device. At 1501, when the movement of the person meets a predefined criterion, the method comprises moving, with the one or more processors, the first content from the display portion to the another display portion and the second content from the another display portion to the display portion.

At 1502, the method of 1501 further comprises, before the detecting the movement of the person, determining whether the person situated within the environment of the electronic device in a display portion viewing orientation relative to the electronic device or another display portion viewing orientation relative to the electronic device. At 1503, the determining of 1502 determines the person is in the display portion viewing orientation when a central axis of a gaze cone of the person is oriented closer to normal with the display portion than with the another display portion.

At 1504, the method of 1503 further comprises designating, by the one or more processors, the first content as a portion of interest when the person is in the display portion viewing orientation. At 1505, the method of 1504 further comprises presenting the second content in a dimmer resolution than the portion of interest.

At 1506, the predefined criterion of 1501 comprises the person standing up. At 1507, the predefined criterion of 1501 comprises the person moving their head above the second device housing.

At 1508, the predefined criterion of 1501 comprises the person moving from a display portion viewing orientation relative to the electronic device to another display portion viewing orientation relative to the electronic device. At 1509, the predefined criterion of 1501 comprises the person making a gesture in three-dimensional space. At 1510, the predefined criterion of 1501 comprises the person increasing a viewing angle relative to the another display portion and decreasing a viewing angle relative to the another display portion by at least a predefined viewing angle threshold.

At 1511, the method of 1501 further comprises, after detecting the movement of the person meeting the predefined criterion detecting another movement of the person within the environment of the electronic device. At 1511, when the another movement of the person meets another predefined criterion, the method comprises returning, with the one or more processors, the first content from the another display portion to the display portion and the second content from the display portion to the another display portion.

At 1512, the partially deformed geometric form factor of 1501 comprises the first device housing being pivoted about the hinge relative to the second device housing to an angle of between seventy-five and one hundred and five degrees, inclusive. At 1513, the display portion of 1512 and the other display portion comprise portions of a flexible display coupled to the first device housing and the second device housing and spanning the hinge.

At 1514, an electronic device comprises a first device housing coupled to a second device housing by a hinge such that the first device housing is pivotable about the hinge relative to the second device housing between a closed position and an axially displaced open position. At 1514, the electronic device comprises one or more sensors operable to determine a partially deformed geometric form factor of the electronic device between the axially displaced open position and the closed position.

At 1514, the electronic device comprises a first display portion coupled to the first device housing and a second display portion coupled to the second device housing. At 1514, the electronic device comprises one or more processors operable with the one or more sensors, the first display portion, and the second display portion.

At 1514, the one or more processors switch content initially presented on the first display portion to be presented on the second display portion when a person viewing the first display portion moves within an environment of the electronic device by at least a predefined amount. At 1515, the first display portion of 1514 and the second display portion comprise portions of a singular, unitary, flexible display coupled to the first device housing and the second device housing and spanning the hinge.

At 1516, the one or more processors of 1514 switch other content initially presented on the second display portion to be presented on the first display portion when the person viewing the first display portion moves within the environment of the electronic device by at least the predefined amount. At 1517, the predefined amount of 1514 increases a viewing angle relative to the second display portion to between forty-five and one hundred and thirty-five degrees, inclusive. At 1518, the predefined amount of 1514 is defined by a predefined gesture in three-dimensional space.

At 1519, a method in an electronic device comprises detecting, with at least a first sensor, a first device housing of the electronic device positioned in a partially open position relative to a second device housing coupled to the first device housing by a hinge. At 1519, the method comprises detecting, with at least a second sensor, whether a person situated within an environment of the electronic device is viewing a first display portion coupled to the first device housing or a second display portion coupled to the second device housing while the electronic device is in a dual content presentation mode of operation.

At 1519, the method comprises detecting, with at least a third sensor, the person moving in three-dimensional space relative to the electronic device. At 1519, the method comprises automatically swapping, with one or more processors, content being presented on the first display portion for other content being presented on the second display portion, and vice versa, in response to the person moving in the three-dimensional space relative to the electronic device. At 1520, the method of 1519 further comprises dimming, by the one or more processors, the other content after the swapping.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, while the method of FIG. 8 described detection of a single movement, of course the method could repeat for additional movements. Thus, after detecting the movement of the person meeting the predefined criterion, the method could further comprise detecting another movement of the person within the environment of the electronic device and, when the another movement of the person meets another predefined criterion, returning, with the one or more processors, the first content from the another display portion to the display portion and the second content from the display portion to the another display portion. Other additional method steps will be obvious to those of ordinary skill in the art having the benefit of this disclosure.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method in an electronic device, the method comprising:
    detecting, with one or more sensors, a partially deformed geometric form factor defined by a first device housing portion of the electronic device pivoted relative to a second device housing portion of the electronic device to a deformed geometry partially between an axially displaced open position and a closed position;
    presenting, with one or more processors, first content on a display portion spanning a major surface of the first device housing portion;
    also detecting, with one or more other sensors, movement of a person viewing the first content within an environment of the electronic device; and
    when the movement of the person meets a predefined criterion, moving, with the one or more processors, the first content from the display portion to another display portion spanning a major surface of the second device housing portion.

2. The method of claim 1, further comprising, before the detecting the movement of the person, determining whether the person situated within the environment of the electronic device is in a display portion viewing orientation relative to the electronic device or another display portion viewing orientation relative to the electronic device.

3. The method of claim 2, wherein the determining determines the person is in the display portion viewing orientation when a central axis of a gaze cone of the person is oriented closer to normal with the display portion than with the another display portion.

4. The method of claim 3, further comprising designating, by the one or more processors, the first content as a portion of interest when the person is in the display portion viewing orientation.

5. The method of claim 4, further comprising, when the movement of the person meets the predefined criterion, moving second content from the another display portion to the display portion and, thereafter, presenting the second content in a dimmer resolution than the portion of interest.

6. The method of claim 1, wherein the predefined criterion comprises the person standing up.

7. The method of claim 1, wherein the predefined criterion comprises the person moving their head above the second device housing portion.

8. The method of claim 1, wherein the predefined criterion comprises the person moving from a display portion viewing orientation relative to the electronic device to another display portion viewing orientation relative to the electronic device.

9. The method of claim 1, wherein the predefined criterion comprises the person making a gesture in three-dimensional space.

10. The method of claim 1, wherein the predefined criterion comprises the person increasing a viewing angle relative to the another display portion and decreasing a viewing angle relative to the another display portion by at least a predefined viewing angle threshold.

11. The method of claim 1, further comprising, after detecting the movement of the person meeting the predefined criterion:
    detecting another movement of the person within the environment of the electronic device; and
    when the another movement of the person meets another predefined criterion, returning, with the one or more processors, the first content from the another display portion to the display portion.

12. The method of claim 1, wherein the partially deformed geometric form factor comprises the first device housing portion being pivoted relative to the second device housing portion to an angle of between seventy-five and one hundred and five degrees, inclusive.

13. The method of claim 12, wherein the display portion and the another display portion comprise portions of a flexible display coupled to the first device housing portion and the second device housing portion.

14. An electronic device, comprising:
- a first device housing portion coupled to a second device housing portion such that the first device housing portion is pivotable relative to the second device housing portion between a closed position and an axially displaced open position;
- one or more sensors operable to determine a partially deformed geometric form factor of the electronic device between the axially displaced open position and the closed position;
- a first display portion coupled to the first device housing portion;
- a second display portion coupled to the second device housing portion; and
- one or more processors operable with the one or more sensors, the first display portion, and the second display portion, the one or more processors switching content initially presented on the first display portion to be presented on the second display portion when a person viewing the first display portion moves within an environment of the electronic device by at least a predefined amount.

15. The electronic device of claim 14, wherein the first display portion and the second display portion comprise portions of a singular, unitary, flexible display coupled to the first device housing portion and the second device housing portion.

16. The electronic device of claim 14, the one or more processors switching other content initially presented on the second display portion to be presented on the first display portion when the person viewing the first display portion moves within the environment of the electronic device by at least the predefined amount.

17. The electronic device of claim 14, wherein the predefined amount increases a viewing angle relative to the second display portion to between forty-five and one hundred and thirty-five degrees, inclusive.

18. The electronic device of claim 14, wherein the predefined amount is defined by a predefined gesture in three-dimensional space.

19. A method in an electronic device, the method comprising:
- detecting, with at least a first sensor, a first device housing portion of the electronic device positioned in a partially open position relative to a second device housing portion coupled to the first device housing portion;
- detecting, with at least a second sensor, whether a person situated within an environment of the electronic device is viewing a first display portion coupled to the first device housing portion or a second display portion coupled to the second device housing portion while the electronic device is in a dual content presentation mode of operation;
- detecting, with at least a third sensor, the person moving in three-dimensional space relative to the electronic device; and
- automatically moving, with one or more processors, content being presented on the first display portion to the second display portion in response to the person moving in the three-dimensional space relative to the electronic device.

20. The method of claim 19, further comprising moving, with the one or more processors, other content being presented on the second display portion in response to the person moving in the three-dimensional space relative to the electronic device and dimming, by the one or more processors, the other content after the moving.

* * * * *